US007762361B2

(12) United States Patent
Hammonds

(10) Patent No.: US 7,762,361 B2
(45) Date of Patent: Jul. 27, 2010

(54) OMNI-DIRECTIONAL AIRCRAFT AND ORDINANCE HANDLING VEHICLE

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 845 days.

(21) Appl. No.: 11/439,046

(22) Filed: May 23, 2006

(65) Prior Publication Data

US 2009/0205908 A1 Aug. 20, 2009

Related U.S. Application Data

(63) Continuation-in-part of application No. 11/274,803, filed on Nov. 15, 2005, now Pat. No. 7,581,603.

(60) Provisional application No. 60/628,415, filed on Nov. 15, 2004.

(51) Int. Cl.
*B62D 11/04* (2006.01)

(52) U.S. Cl. ..................................... 180/6.48; 212/197

(58) Field of Classification Search ................ 180/6.2, 180/6.48, 6.5; 212/195, 196, 197, 198
See application file for complete search history.

(56) References Cited

U.S. PATENT DOCUMENTS 3,572,517 A * 3/1971 Liebherr et al. ............. 212/300

| | | | |
|---|---|---|---|
| 4,679,336 A * | 7/1987 | Brocklebank et al. | ......... 37/443 |
| 4,773,814 A * | 9/1988 | Brocklebank et al. | .... 414/695.5 |
| 5,598,935 A * | 2/1997 | Harrison et al. | ............. 212/197 |
| 5,704,498 A * | 1/1998 | Smith et al. | ................. 212/231 |
| 6,341,665 B1 * | 1/2002 | Zhou et al. | .................... 182/2.8 |
| 6,581,703 B2 | 6/2003 | Hammonds | |
| 6,830,111 B2 * | 12/2004 | Page | ........................... 172/42 |
| 6,830,114 B2 | 12/2004 | Hammonds | |
| 6,860,345 B2 | 3/2005 | Hammonds | |

FOREIGN PATENT DOCUMENTS

JP          62-283072          12/1987

* cited by examiner

*Primary Examiner*—Kevin Hurley
(74) *Attorney, Agent, or Firm*—Gary L. Bush; Brett T. Cooke; Andrews Kurth LLP

(57) ABSTRACT

A powered omni-directional aircraft and ordinance handling vehicle which, in one embodiment, includes a circular frame and two drive wheels capable of independent powered forward and rearward rotation about a horizontal axis. The drive wheels are adapted to allow the vehicle to spin in place about a vertical axis which intersects the horizontal axis midway between the drive wheels and which is generally centered in the circular frame. A turret is rotatively mounted to the frame such that it is capable of rotation about the vertical axis, and an articulated ordinance handling arm is mounted to the turret. A castor is mounted to the frame for supporting the frame on the ground. A control system enables the vehicle to rotate in place to change headings while maintaining ordinance carried by the arm motionless with respect to the ground and to perform repetitive precise multi-axis motion control of the vehicle.

20 Claims, 18 Drawing Sheets

OMNI-DIRECTIONAL AIRCRAFT AND ORDINANCE HANDLING VEHICLE

CROSS REFERENCE TO RELATED APPLICATIONS

This application is a continuation in part of U.S. patent application Ser. No. 11/274,803 filed on Nov. 15, 2005, now U.S. Pat. No. 7,581,603 which is based upon U.S. Provisional Patent Application No. 60/628,415 filed on Nov. 15, 2004, the priority of which is claimed.

BACKGROUND OF THE INVENTION

1. Field of the Invention

This invention relates generally to a wheeled vehicle designed to turn about a vertical axis. In particular, the invention relates to powered utility riding vehicles of the type useful for military and naval aircraft servicing operations.

2. Description of the Prior Art

Conventional tow vehicles for aircraft, often called tractors, are typically configured with two axles, one in front, the other in the rear. The rear axle is fixed to the vehicle and provides motive force; two additional wheels are located at the front end of the vehicle, each being steerable and connected together to provide steering of the vehicle. Since there is a distance between the fixed rear drive wheels and the axis of the steerable wheels at the front end of the vehicle, a turning radius is required that far exceeds the space actually occupied by the vehicle itself. The longer the distance between the front and rear axles, the larger is the turning radius that is required to change direction of the vehicle. A large turning radius makes maneuvering around crowded airfields and naval vessels difficult and often dangerous. Operators are required to look over their shoulders in order to back up, and congestion is commonplace. A need exists for a service vehicle that requires less square footage for its footprint and less maneuvering space so that operator and aircraft safety are enhanced.

3. Identification of Objects of the Invention

A primary object of the invention is to provide a service vehicle that has enhanced maneuverability for towing or pushing aircraft and for handling munitions or ordinance, such as for securing missiles or bombs to the underside of military aircraft wings.

Another object of the invention is to provide a service vehicle that can turn on the spot and be of the smallest physical size relative to the space it occupies.

Another object of the invention is to provide a service vehicle which reduces the risk of accidents which result in damage or injury to equipment or operating personnel.

Another object of the invention is to provide a service vehicle with computer or numerically controlled motion indexing in multiple axes for precisely performing repetitive ordinance handling functions.

SUMMARY OF THE INVENTION

The features identified above, as well as other features of the invention are incorporated in a vehicle that, due to a combination of its characteristics including its shape and the configuration of its drive wheels, provides unique maneuverability and efficiency. When the vehicle is combined with a radial movable hitch to its circular frame, such combination provides for free circumferential attachment to and movement of other vehicles for transport of such vehicles with minimal space required for maneuverability and safety of operation. Such vehicles include tow bars adapted for moving aircraft.

The vehicle according to one embodiment of the invention has a frame with a perfectly round outer surface about its perimeter with no external appendages. That outer surface is characterized as a perfect, unobstructed smooth circle defined by a vertical axis of the vehicle. The vehicle has two independent drive wheels located on a horizontal axis which intersects the vertical axis. Each wheel is at exactly the same distance from the vertical axis, with each wheel having the capability to move independently and at infinitely variable speeds in either direction. Thus, the vehicle is capable to move in any direction by rotating the axis of the drive wheels perpendicular to the desired direction of travel. By applying motive force to the wheels in the appropriate direction and speed, the vehicle can turn and move in any direction perpendicular to the axis of the drive wheels within the area covered by its circumference. Rotating about the vertical axis to any radial position without changing its original footprint, the vehicle requires a true zero turning or maneuvering radius, and thus requires only the space that it occupies in which to maneuver in any direction. The "footprint" is the area on the ground below the vehicle when it is at rest.

One embodiment of the invention is a vehicle capable of pulling single or multiple pieces of equipment such as trailers or various sized objects such as aircraft. In this configuration as a tow vehicle or tractor, the vehicle is equipped with a smooth outer ring including upper and lower rails which support a trolley. The trolley includes a plurality of precision wheels or rollers that are rotatably coupled to the upper and lower rails of the outer ring and enable the trolley to move freely around the entire circumference of the outer rim of the vehicle. The trolley can be rotated either manually, or through the use of a motor, for positioning the trolley to the desired position at any point about the circumference of the vehicle prior to connection to the object to be moved. Attached to the trolley via a hitch is a pivoting arm that can be quickly removed or stored in the vertical position perpendicular to the ground when not in use, or when required, lowered to a position approximately parallel to the ground where it may then be attached to an airplane. The connecting arm is capable of movement about an arc vertically from its pivot point, but not laterally relative to the pivot point.

When the connecting arm is then connected to the object to be moved, and after the axis of the tow vehicle drive wheels is positioned (by operator action) perpendicular to the desired direction of movement, the tow vehicle exerts a pushing or pulling motive force against the object (e.g., airplane) being towed or pushed. The direction of travel of the towed or pushed object can be changed by adjusting the angle of the connecting arm or hitch relative to the direction of travel of the axis of the tow vehicle drive wheels. This is accomplished by rotating the axis of the drive wheels of the tow vehicle radially to any desired angle relative to the object being towed or pulled and then exerting forward or reverse power to the drive wheels. Because the trolley assembly to which the connecting arm is attached is capable of movement freely about the circumference of the tow vehicle, the angle of the connecting arm or hitch can constantly be adjusted to achieve the desired direction of travel of the object being pulled or pushed. This changing of relative angle and direction does not transmit any stress to the object being pushed or pulled, because the speeds of the drive wheels are continuously variable from zero to maximum and the trolley and arm move about the circumference of the tow vehicle with very little, if any, friction.

The arrangement of a substantially outer circular shape of a vehicle with a smooth and unobstructed outer perimeter in combination with two independently variable speed bi-directional drive wheels located on a single axis through the exact center of the vehicle and a hitch that is free to move about the full circumference of the vehicle results in a tow vehicle characterized by the ability to move omni-directionally about a given point, change directions with zero maneuvering room beyond the physical footprint of the vehicle, and push or pull other mobile vehicles with precise control. Such characteristics reduce the operating space on the ground required to move or handle an object being manipulated, thus increasing operating efficiency. Safety is increased because the operator of such a vehicle, positioned directly at the center of the tow vehicle, can always be facing the direction the vehicle is moving, never having to back up or look backwards.

Whether pushing or pulling another object such as an aircraft, the field of vision of the operator of the tow vehicle is always facing the direction of movement of the vehicle. In operation, the operator rotates the axis of the drive wheels until it is perpendicular to the direction of the desired travel by rotating one wheel in one direction and the other in the opposite direction. Once the desired drive axle orientation is reached (perpendicular to the desired direction of travel), both wheels are given power equally, causing the vehicle to move in the direction perpendicular to the drive wheel axis of the tow vehicle axle. The vehicle being towed or pushed is then steered in the new direction and the angular attitude between the tow vehicle and the steering axle of the vehicle being towed or pushed automatically comes into an appropriate geometry as the radial hitch travels about the perimeter of the tow vehicle.

The maneuvering characteristic of the omni-directional vehicle equally lends itself to use where precision 2, 3, 4 or more axis indexing, i.e., detailed positioning, of the vehicle is required. For example, the omni-directional vehicle is well suited for precisely positioning ordinance to be loaded on an aircraft wing. Thus, in another embodiment of the invention, the vehicle may include a turret assembly, rotatably mounted on the vehicle frame. The turret assembly preferably includes an articulated arm which can be extended to carry a weapon or folded when not in use. The vehicle has a turret motor drive to rotate the turret. The omni-directional vehicle can rotate in place in one direction while the turret is simultaneously rotated in the opposite direction (with respect to the vehicle frame) at the same rate. This action allows the arm and supported weapon to remain motionless over the ground while the vehicle changes heading. The weapon can then be translated over the ground a given distance at the new heading. Alternatively, a weapon can be rotated by rotating the turret while the vehicle remains stationary over the ground or moves linearly. In an alternative embodiment, the ODV may not include a turret, but the ordinance handling arm may be rotatively mounted to the ODV body such that it rotates about the vertical axis.

In an another embodiment, the ODV is equipped with a Computer Numerical Control (CNC) system to provide the capability for programming complex combinations of multi-axis motions.

In a preferred embodiment, the vehicle includes both a circumferential trolley hitch assembly with a towbar and an articulated ordinance handling arm for maximum versatility.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 1:
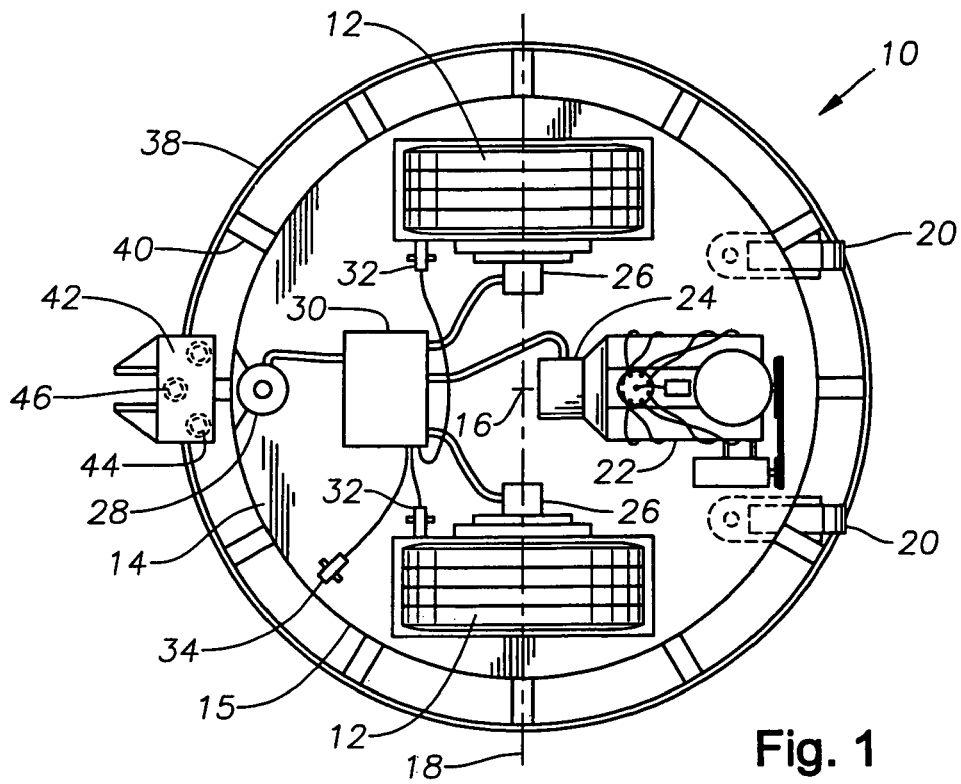
FIG. 1 is a horizontal cross section along lines 1-1 of FIG. 2 looking down into one embodiment of an Omni-Directional Vehicle (ODV) according to the invention showing major drive components, a circular rail about the frame of the ODV, and a trolley hitch assembly rotatably mounted on the rail.
Figure 2:
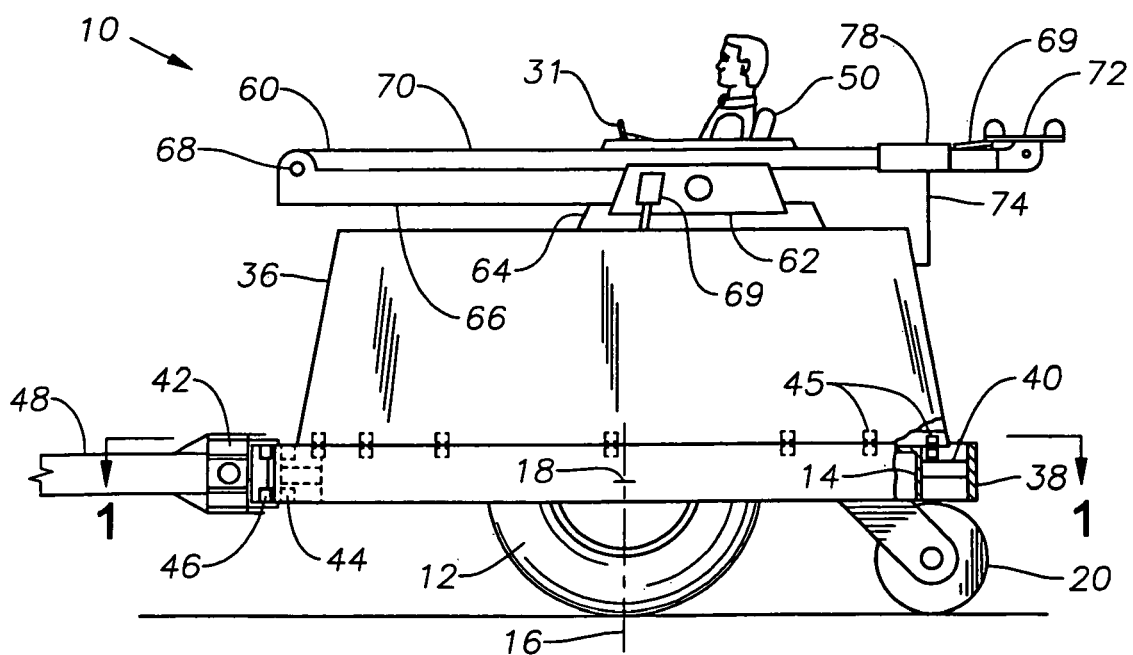
FIG. 2 is a side view of the ODV of FIG. 1 showing a hitch-mounted aircraft towbar, a rotatable turret assembly and an ordinance handling arm folded in a stowed position.

FIG. 1 is a horizontal cross section, taken along lines 1-1 of FIG. 2, of an Omni-Directional Vehicle 10 (hereafter ODV) according to one embodiment of the invention. The ODV 10 includes two drive wheels 12 rotatively mounted on a frame 14 which has an outer perimeter 15 in the shape of a circle. The circular frame 14 has a vertical axis 16 which is perpendicular to the horizontal plane of FIG. 1. The drive wheels 12 are mounted along a horizontal axis 18 which is perpendicular to the vertical axis and intersects the vertical axis as shown in FIG. 1. Two swivel castor wheels 20 are pivotably mounted to the frame 14 at the rear of the ODV 10. However, a different number of swivel caster wheels may be mounted at various points along frame 14.

Referring to FIG. 1, a power source 22 is mounted on the frame 14. The power source 22 is preferably a diesel engine which powers a generator 24 similar to a motive drive assembly of a diesel locomotive for train service, for example. However, other sources 22 may be used, including a gasoline internal combustion engine or turbine engine. The generator 24 provides electric power to two separate electric motor assemblies 26, one for each drive wheel 12, and optionally to a turret motor 28 and/or other actuators 69 (FIG. 2). Drive motors 26 and turret motor 28 are preferably DC stepper motors or servo motors which allow precise positioning, indexing, and instant starting, stopping and reversing. The speed and direction of rotation of electric motors 26 and the drive wheels 12 driven thereby is controlled by a control system 30 which provides drive current sources based on the desired motion.

The control system 30 receives electric power from generator 24 and powers drive motors 26 and turret motor 28 as directed by the control circuitry based on control and feedback inputs. Control inputs preferably include two user-operated hand levers 31 (FIG. 3), one for the operator's left hand and the other for the operator's right hand. Feedback inputs include proximity sensors 32 or similar position and/or speed indicators for each of the two drive wheels 12 and a proximity sensor 34 or similar position and/or speed indicator for the turret assembly 36 (FIG. 2).

During aircraft movement operations, the turret 36 is held stationary with respect to frame 14. The left and right control levers 31 operate exactly the same to control the left and right drive wheels 12, respectively. Each lever and valve has a neutral position, such that when a lever is at such neutral position, a wheel associated with that lever is electrically braked. If a lever is pushed forward away from the operator, the corresponding wheel motor 26 is driven in the forward direction for turning its attached drive wheel 12. Likewise, if a lever 31 is pulled toward the operator, the corresponding motor 26 and drive wheel 12 are driven in reverse. The greater distance that a lever is moved from its neutral position, the faster the associated wheel motor 26 and drive wheel 12 turn.

If both levers 31 are moved in the same direction and amount and at the same time, both drive wheels 12 move at the same speed, thereby causing straight-ahead movement of the ODV 10 over the ground. That movement is perpendicular to the horizontal axis 18. If the levers 31 are pushed forward or backward at an unequal distance from each other, the lever 31 moved the greater distance will produce a greater speed of rotation, causing the vehicle 10 to turn in the direction of the slower drive wheel 12. For example, if the right control lever 31 is pushed farther forward than is the left lever 31, the ODV 10 turns to the left, and vice versa.

If the right lever 31 is moved forward and the left lever 31 is moved backward and both lever positions are the same in amount and opposite in direction, the left wheel 12 turns backward and the right wheel 12 turns forward, both at the same rate of rotation. In this instance, the ODV 10 turns in its own space or footprint while its footprint generally remains stationary over ground, i.e., the ODV rotates about the vertical axis 16. (The footprint over the ground is the area of the ground beneath the vehicle.) The counter-clockwise rotation described above becomes a clockwise rotation when the right wheel 12 rotates backward at the same rate as the forward rotation of the left wheel 12. Thus, the ODV 10 can change its heading while generally not moving or varying its footprint over the ground. If the ODV 10 does not interfere with any object on the ground at one heading, it will not likely interfere with any object at any heading because the ODV footprint generally does not change during rotation.

The two drive wheels 12 are preferably located in the exact center axis 18 of the vehicle 10. Two additional swivel wheels or castors 20 are ideally mounted at the rear of the vehicle 10. The rear castors 20 provide support for balancing the weight of the vehicle, supporting the power source 22 and other ballast weight (as required to counterbalance a loaded ordinance handling arm) to keep the frame 14 substantially level. The swivel castors 20 are mounted on the frame 14 at positions so as not to protrude from the outer circumference of the vehicle when the vehicle is turning about vertical axis 16 in order to prevent contact with other objects while the ODV 10 is spinning. When the ODV 10 moves forward, the castors 20 may trail outside the ODV circumference without any substantial obstruction effect. Although ODV 10 is illustrated as having two swivel casters 20, any number of swivel castors may be employed at varying points along the frame 14, depending on the weight distribution and application of vehicle.

FIG. 1 shows a circular trolley rail or ring 38 is mounted to the frame 14 with a plurality of mounting spacers 40 or by other suitable means. The trolley rail 38 provides a smooth running surface for one or more movable trolley hitch assemblies 42. Trolley hitch assembly 42 has a plurality of rollers 44 located inboard of the rail 38 and rollers 46 located outboard of the rail 38 which rotatably capture rail 38 with substantially no looseness. The trolley hitch assembly 42 is the point of quick-couple attachment for the aircraft towbar assembly 48 (FIG. 2). The trolley hitch assembly 42 is preferably arranged and designed to freely rotate about circular rail 38, although it may be rotated by powered assemblies with electric or hydraulic motors, for example.

Figure 3:
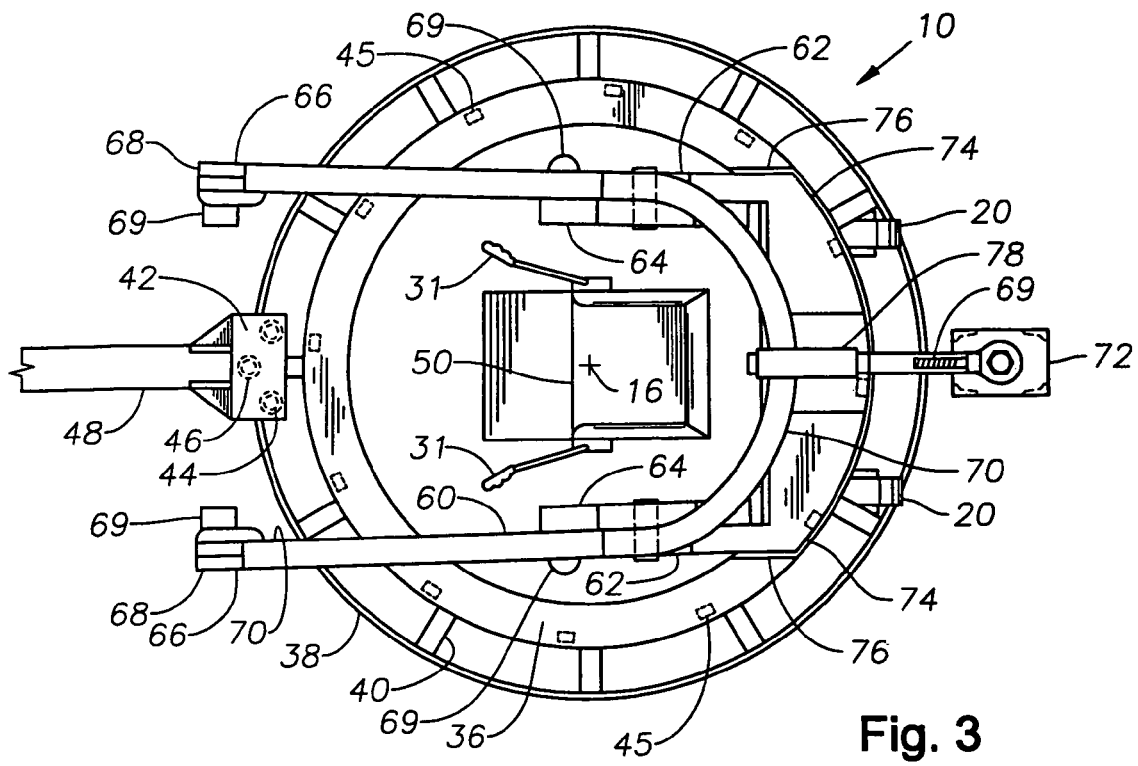
FIG. 3 is a top view of the ODV of FIG. 2 showing the operator's seat and control levers.

FIGS. 2 and 3 are side and top views, respectively, of the ODV 10 according to a preferred embodiment. An aircraft towbar assembly 48 is shown attached to the trolley hitch assembly 42. The towbar 48 and trolley hitch assembly 42 are preferably designed for quick coupling and uncoupling. A turret assembly 36 is shown rotatably mounted to the ODV frame 14. The turret 36 rotates about the vertical axis 16. The rotation of turret 36 relative to frame 14 is preferably controlled by turret motor 28 (see FIG. 1) which has a rotor which engages a race or circular rack (not shown) mounted to an inside of turret 36, although other mechanisms may be used. The turret motor 28 is in turn controlled by control system 30 (see FIG. 1). The turret 36 is shown generally having a frustro-conical shape, although other shaped turrets may be used. FIGS. 2 and 3 also show rollers 45 which rotatably engage a race portion 47 (see FIGS. 4-5) of ODV frame 14 along outer perimeter 15. The rollers 45 are intervaled along the perimeter of turret 36 and provide a bearing mechanism between the turret 36 and ODV frame 14. The number and size of the rollers are dependent on the expected turret loads. However, other suitable bearing arrangements may be used. A seat 50 for the operator is mounted on top of the turret 36, preferably in a location which coincides with or is near to vertical axis 16.

Figure 4:
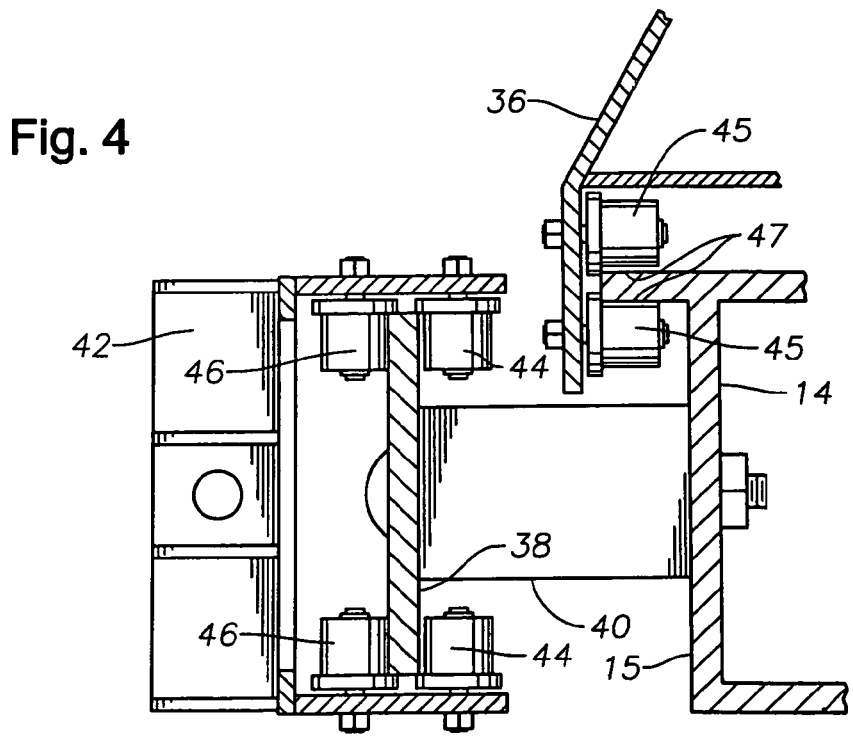
FIG. 4 is a detailed side cross section of the ODV frame and circular trolley rail of the vehicle of FIG. 1 showing the trolley hitch assembly and a typical portion of the turret mount assembly.

FIG. 4 is a side view cross section of the trolley rail 38 and its attachment to the vehicle frame 14 with spacers 40 placed around the frame perimeter 15. Trolley hitch assembly 42 has a plurality of rollers 44 positioned inboard of the trolley rail 38 and a plurality of rollers 46 positioned outboard of the rail 38. Both the inboard and outboard side of rail 38 has rollers positioned at both the top and bottom of the rail 38, usually in sets. In other words, the rollers are preferably positioned with a number of upper and lower roller pairs 44 set inboard of the rail 38 and generally an equal number of upper and lower roller pairs 46 set outboard of the rail 38. The rollers 44, 46 rotatably capture rail 38 with substantially no vertical or horizontal looseness. The mounting positions of the rollers 44, 46 match the curvature of the rail 38, thus allowing the trolley hitch assembly 42 to rotate smoothly with minimal friction and resistance about rail 38. The number and size of rollers 44, 46 may vary depending on the expected maximum loads. The rollers 44, 46 bear loads in both the horizontal and vertical directions and thus may be equipped with bearings to provide smooth rotation of the trolley hitch assembly 42 with respect to the ODV frame 14 while under load. The smooth trolley hitch movement reduces stress on the vehicles being moved, such as aircraft that typically have delicate landing gear.

Figure 5:
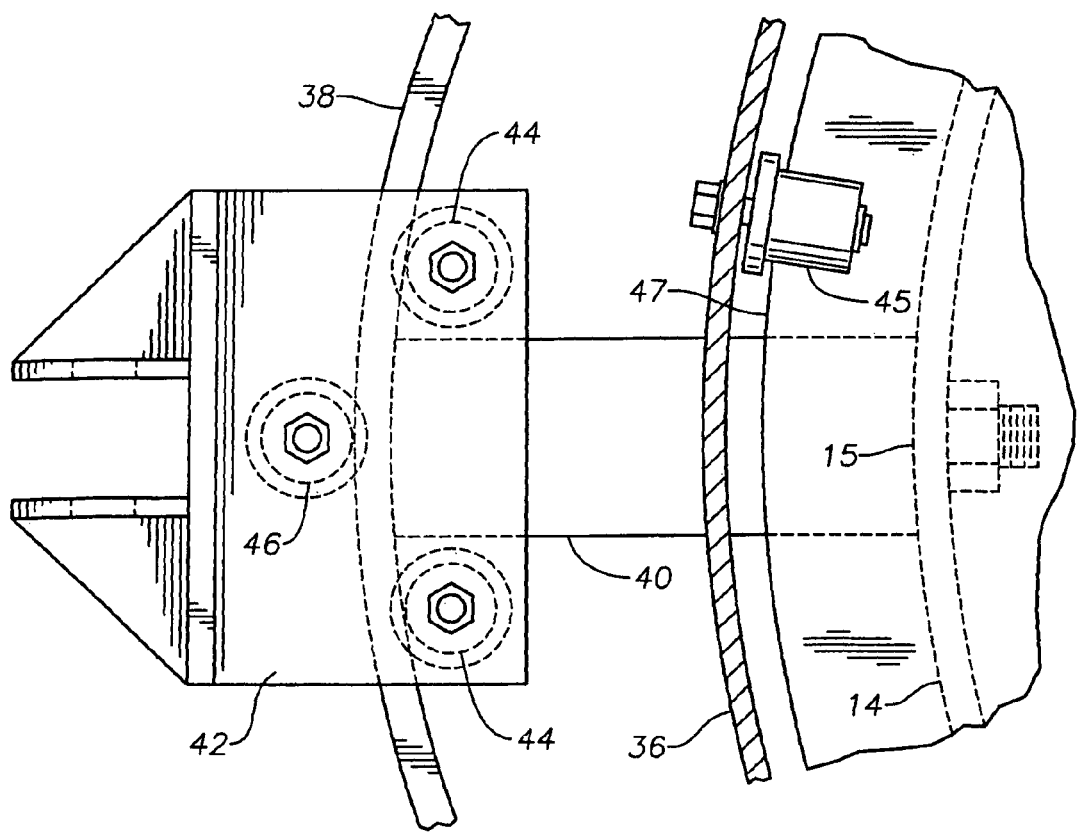
FIG. 5 is a detailed top cross section of the ODV frame and circular trolley rail of the vehicle of FIG. 1 showing the trolley hitch assembly and a typical portion of the turret mount assembly.

FIG. 5 illustrates the trolley hitch assembly 42 from a top view. The two roller pairs 44 located inboard of the rail 38 and one roller pair 46 located outboard of the rail trap the rail with substantially no looseness. FIGS. 4 and 5 also show turret rollers 45 which rotatably engage a race portion 47 of ODV frame 14 along outer perimeter 15. The rollers 45 are preferably intervaled along the perimeter of turret 36 and provide a bearing mechanism between the turret 36 and ODV frame 14 for smooth rotation under load. The number and size of the rollers are dependent on the expected turret loads. Alternatively, plain bearings, cams, or other suitable devices may be used in place of rollers 44, 45, 46.

Figure 6:
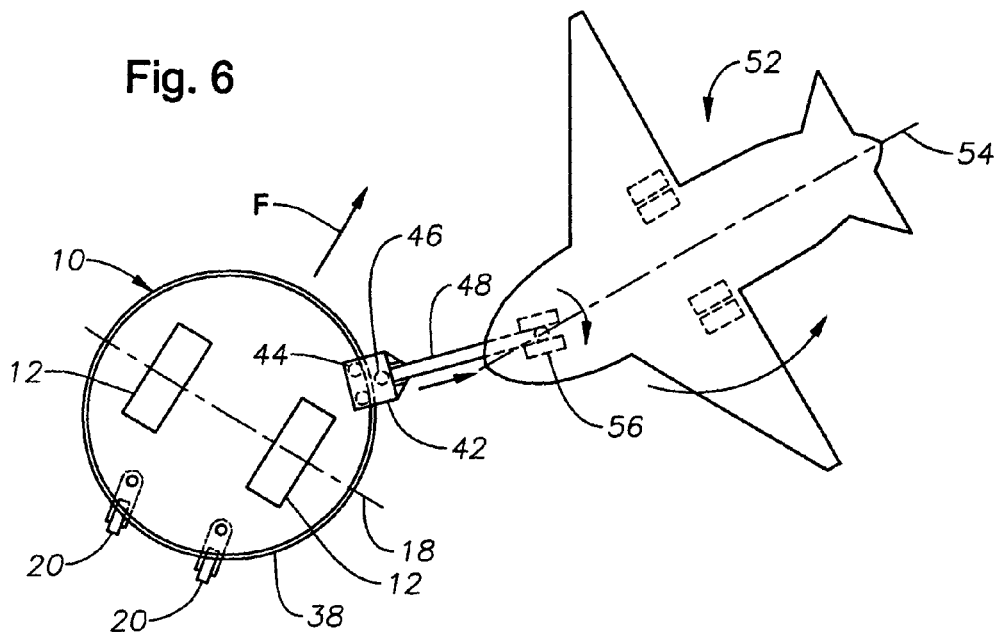
FIGS. 6 and 7 are plan view illustrations of the ODV pushing an airplane such that airplane is caused to turn while being pushed.
Figure 7:
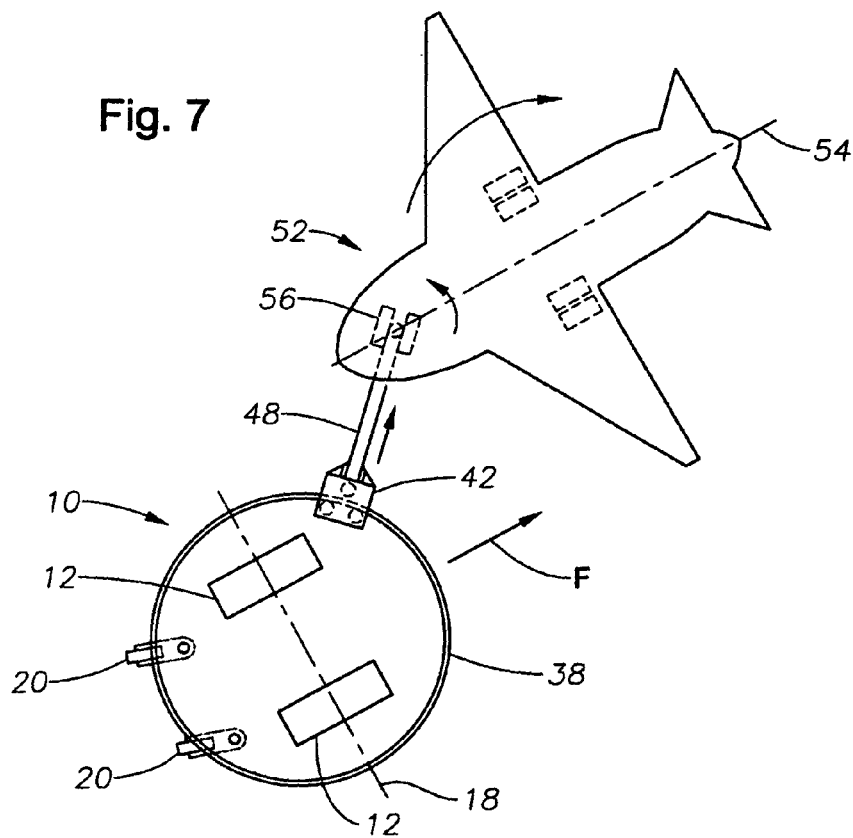

Referring to FIGS. 6-7, the trolley hitch assembly 42 is preferably able to freely rotate about trolley ring 38 during aircraft movement operations. The operator of the ODV 10 in this configuration positions the vehicle relative to the aircraft towbar assembly 48 (and aircraft 52) attached to trolley hitch assembly 42 by keeping the ODV 10 behind the towbar 48. The motion is similar to backing up a vehicle with a towed trailer, except the operator is facing in the direction of motion. In other words, the towbar assembly 48/aircraft 52 is coupled to the trolley hitch assembly 42 at the front of ODV 10, and the operator is able to steer the aircraft 52 by slightly turning the vehicle to the right or the left. If the trolley hitch assembly 42 is allowed to get too far from the front center of the ODV 10, its tendency is to pass down the side of the vehicle to the rear causing a jack-knife situation. In this case, the operator must "turn into the trolley" to regain a position firmly behind the trolley hitch assembly 42. An operator is able to quickly maneuver the towbar 48 in the same manner that a window washer expertly wields a squeegee.

FIGS. 6 and 7 illustrate the ODV 10 pushing an airplane 52 by rotating the drive wheels 12 of the ODV such that the forward direction of the ODV 10 is depicted by the arrow F. The forward direction F is perpendicular to the horizontal axis 18 running through the drive wheels 12. In FIG. 6, the arrow F is directed to the airplane's right side of centerline 54; with both wheels moving forward, the trolley hitch assembly 42 tends to move to the right side of ODV 10 and the nosewheel 56 of the airplane 52 is turned to the right, causing the airplane 52 to turn toward the right, i.e., to move in a counter clockwise arc when viewed from above, as it is pushed rearward. FIG. 7 shows the opposite maneuver. ODV 10 forward motion F is directed to the aircraft's left side of centerline 54, causing the opposite movement of the nosewheel 56 and a clockwise rotation of the airplane as it is pushed rearward. In this manner, the ODV 10 is capable of controlling the direction of movement of the airplane 52 in a smooth, uninterrupted manner. Because the drive wheels 12 of the ODV are continuously variable, it is possible to move at only creeping speeds up through maximum travel speeds without changes in gears or interrupting the movement of the airplane 52.

Referring back to FIGS. 2 and 3, the ODV according to one embodiment has an ordinance handling mechanism 60 attached to the top of turret assembly 36. Preferably, the ordinance handling mechanism 60 is articulated so that it may be folded to minimize the ODV footprint when its use is not required. For example, the ordinance handling mechanism 60 may consist of two trunnion assemblies 62, each pivotably carried by a stand 64 mounted to the turret 36. The stands 64 and/or trunnion assemblies 62 are outfitted with actuators 69 to control pivoting of the trunnion assemblies 62. The actuators 69 are preferably electric and capable of incremental and precise positioning, but other actuators, for example, hydraulic actuators may be used. As actuators are well known in the art, they are not discussed further herein. Attached to the forward end of each trunnion assembly 62 is a lower arm 66 which terminates in a hinge 68. The two hinges 68 are pivotably attached to a U-shaped upper arm assembly 70. The distal end of the upper arm assembly 70 terminates in a holding tool or cradle 72 which is designed and arranged to accommodate a particular weapon. The cradle 72 may also have its position controlled by an actuator 69, preferably an electric actuator. A U-shaped counterweight assembly 74 is attached to the rear ends of the trunnion assemblies 62 to balance the weight of a weapon held in cradle 72. A recess 76 in the conic frustum-shaped turret 36 may be provided to accommodate the counterweight assembly 74 if necessary. The ordinance handling mechanism is preferably disposed such that the operator's seat 50 is located within the U-shaped upper arm assembly 70 when the upper arm assembly is folded in the stowed position as shown. The upper arm assembly 70 may optionally have a length adjustment mechanism 78.

Figure 8:
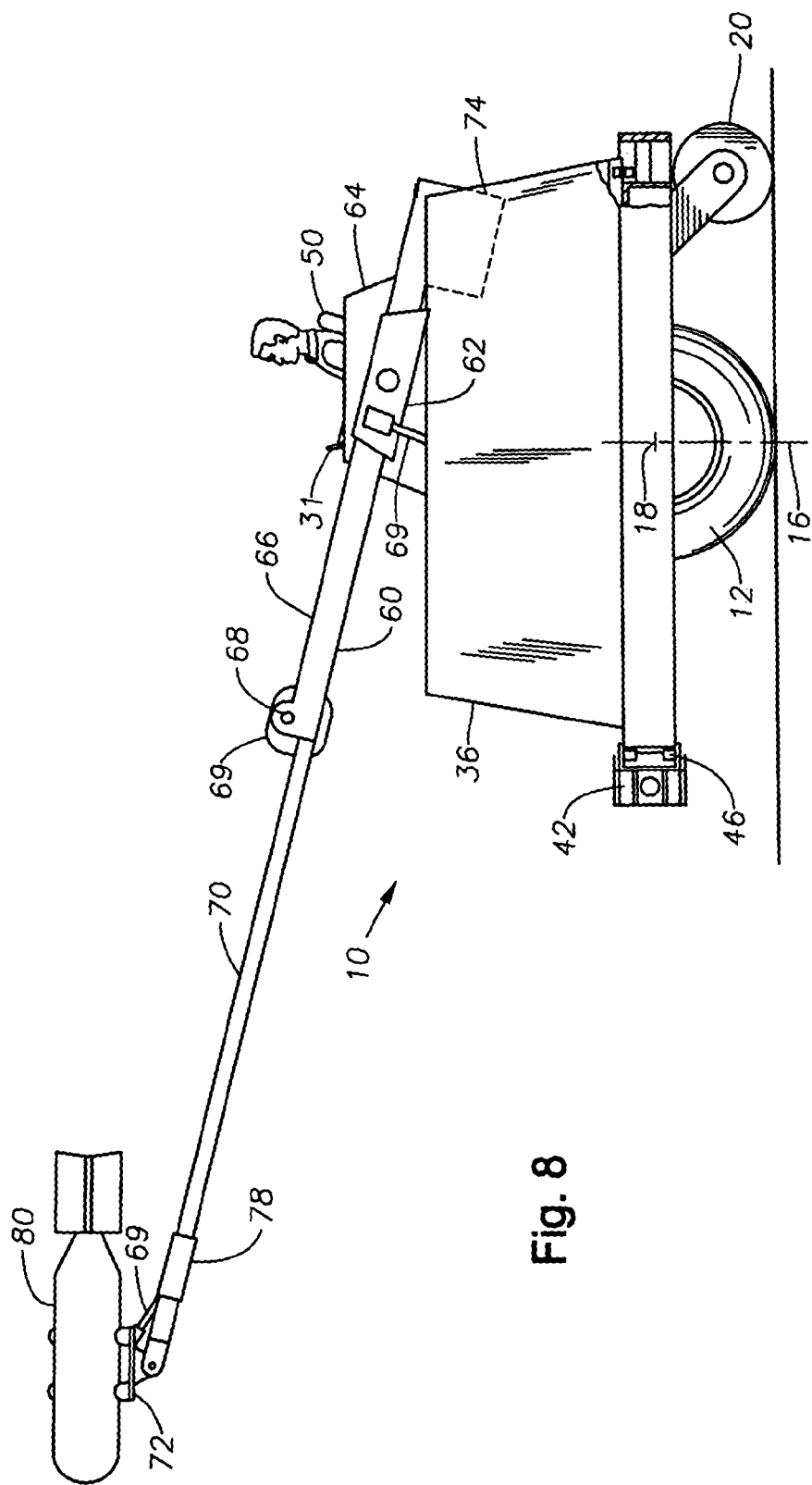
FIG. 8 is a side view of the ODV of FIG. 2 showing the ordinance handling arm extended for use and carrying ordinance.
Figure 9:
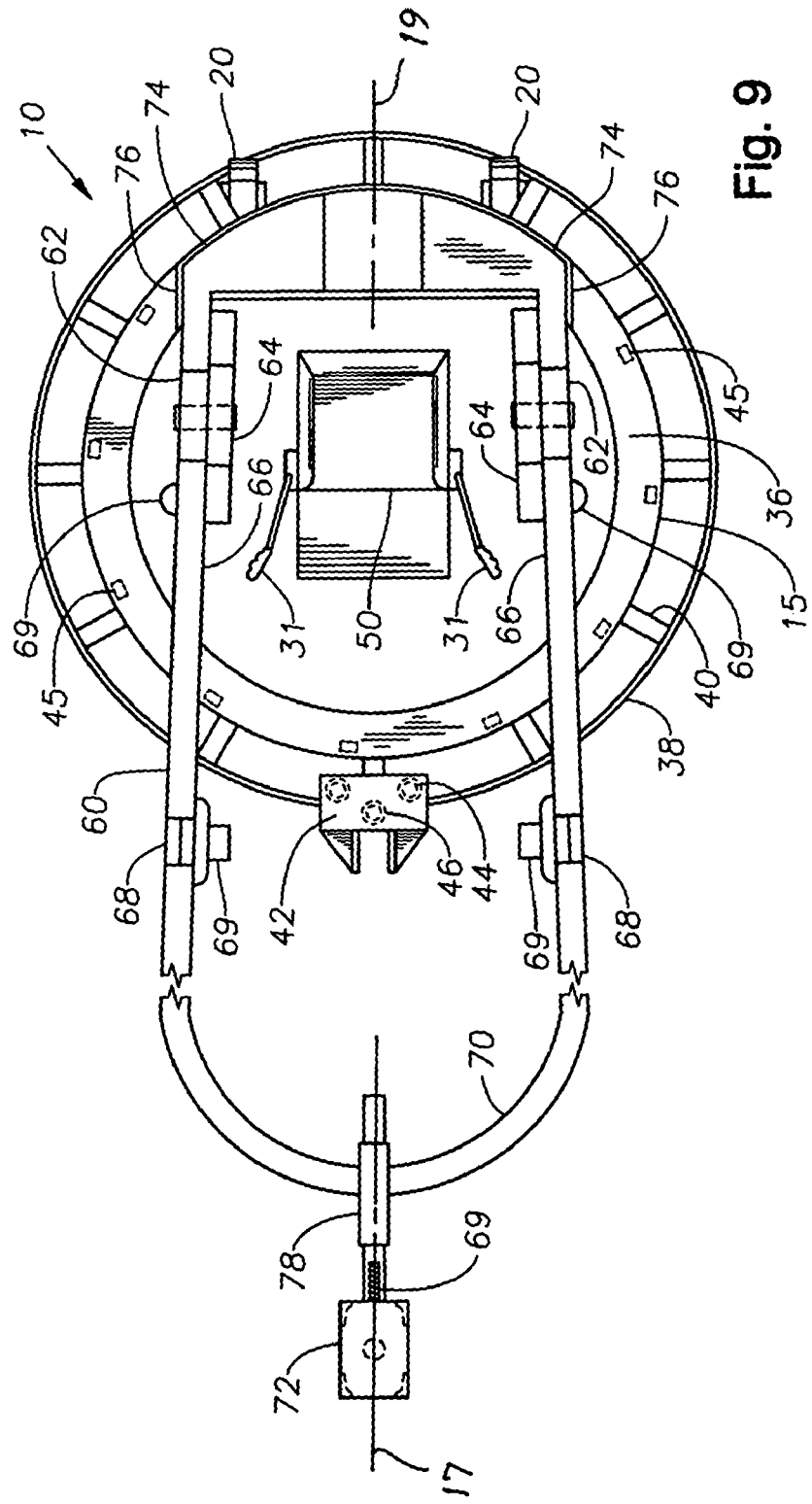
FIG. 9 is a top view of the ODV of FIG. 8 showing the operator's seat and control levers.

FIGS. 8 and 9 are side and top views, respectively, of the ODV 10 illustrated in FIG. 2-3 showing the ordinance loading mechanism 60 in an unfolded operating position. Each hinge 68 is designed so that mating ends of lower arm 66 and upper arm 70 abut when the arms are linearly aligned so that upper arm 70 is supported when extended. The ordinance handling mechanism 60 defines a generally central axis 17 which lies in a first radial direction from vertical axis 16. Similarly, the counterweight assembly 74 defines a generally central axis 19 which lies in a second radial direction from vertical axis 16 that is 180 degrees opposite to the first radial direction of the ordinance handling mechanism axis 17. Thus, as turret 36 is rotated, the radial directions of axes 17 and 19 change. The towbar assembly 48 is preferably removed from trolley hitch assembly 42 for munitions handling operations.

Referring to FIGS. 2, 3, 8, and 9, although a U-shaped upper arm assembly 70 is described and illustrated, other configurations such as Y-shaped, yoke, wishbone, or other suitably shaped arms may be used. Furthermore, ordinance handling mechanisms 60 which do not pivot as such, for example, a scissors jack assembly, piston jack, etc., may be used as appropriate. In an alternate embodiment (not illustrated), the ODV does not contain a movable turret. Rather, an ordinance handling mechanism which itself rotates about vertical axis 16 is mounted to a fixed ODV body, cab, or frame.

Figure 10:
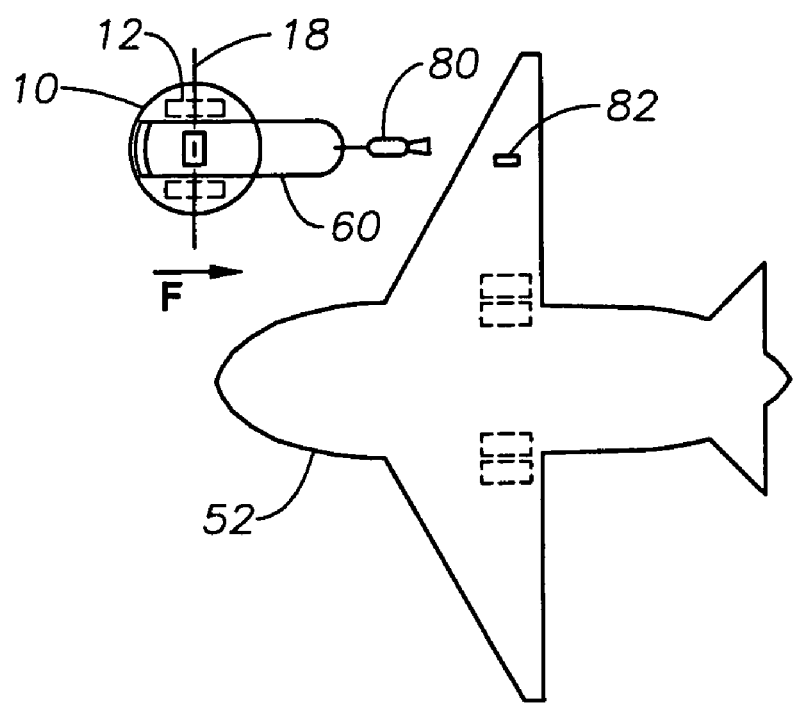
FIGS. 10, 11 and 12 are plan view illustrations of the ODV of FIG. 9 attaching bomb, rocket, or the like to the underside of an airplane wing, showing the ability of the ODV to change headings while keeping the weapon stationary over ground and to translate in any heading.
Figure 11:
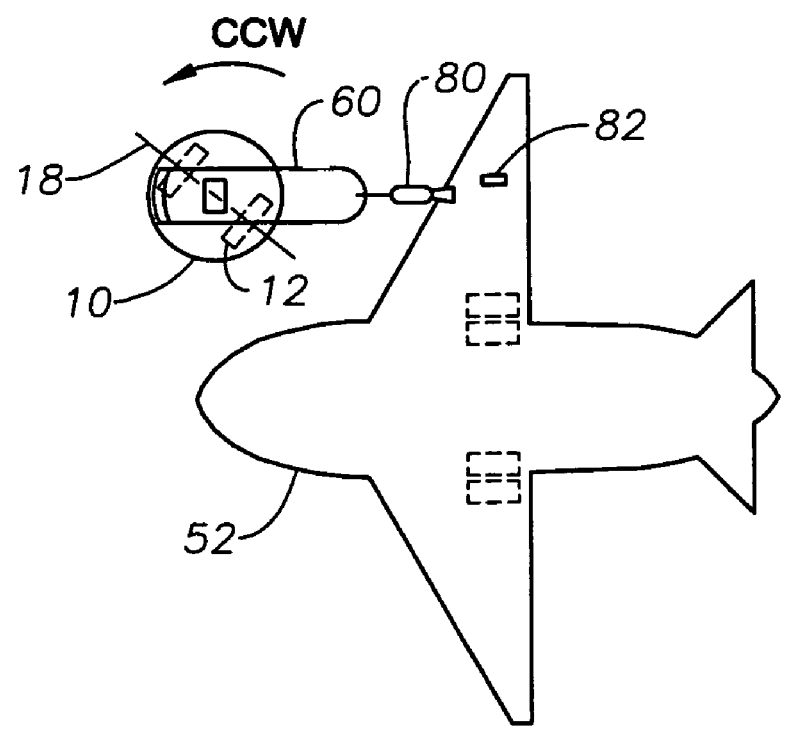
Figure 12:
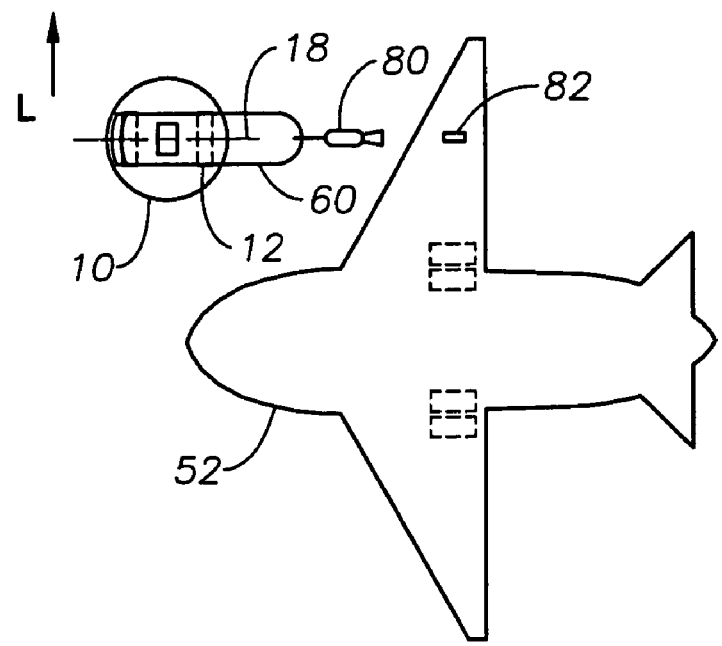

Referring to FIGS. 10-12, a sequence for loading a bomb on to the underside of a wing of aircraft 52 using ODV 10 is illustrated. In FIG. 10, a bomb 80 is carried by ordinance loading mechanism 60. The ODV 10 is moved forward in the direction labeled F by moving both drive wheels 12 forward at the same rate of rotation to position bomb 80 under receptacle 82. In FIG. 11, bomb 80 is laterally misaligned from receptacle 82. The ODV 10 rotates counterclockwise by driving the right wheel 12 forward and left wheel backward at the same rates of rotation. Simultaneously, turret 36 is rotated clockwise with respect to the ODV frame 14 by turret motor 28 (see FIG. 1) at the same rate of rotation as the ODV over ground. Thus, weapons handling mechanism 60 remains stationary over the ground. Control system 30 uses feedback sensors 32 on drive wheels 12 and feedback sensors 34 on the turret to control the drive wheel motors 26 and turret motor 28 so that turret 36 remains motionless during the operation (see FIG. 1). In FIG. 12, ODV 10 is facing perpendicular to ordinance handling mechanism 60. Both drive wheels 12 are now moved slowly forward at the same speed to move bomb 80 laterally in direction L with respect to aircraft 52. Next, bomb 80 is laterally aligned with receptacle 82. The process described with respect to FIG. 11 is now reversed so that ODV 10 rotates clockwise while turret 36 rotates counterclockwise at the same rate. In other words, ODV rotates clockwise "under" turret 36, which is held stationary over ground. ODV 10 is rotated until it is aligned in the forward direction with ordinance loading mechanism 60 as shown in FIG. 10. The ODV is now driven forward until bomb 80 is perfectly aligned with receptacle 82 for attachment thereto.

The control system 30 (FIG. 1) is preferably computer controlled and includes appropriate position, speed and/or acceleration sensors for feedback. The control system may include additional inputs, such as strain gauges or optical sensors mounted on the ordinance loading mechanism 60 for determining distance and relative bearing of the bomb 80 to the receptacle 82. Unequal wheel speeds and turret rotation allow for sophisticated and variable positioning of bomb 80. An infinite number of complex combinations of motions may be accurately repeated. In the preferred embodiment, drive wheel motors 26, turret motor 28 and ordinance handling mechanism 60 actuators 69 are all electric devices capable of precise positioning and centrally controlled by control system 30. Control system 30 is preferably designed and arranged to be programmed, much like numerically controlled (CNC) machines, to perform repetitive tasks requiring precise motion control of numerous degrees of freedom. An operator sets the control system 30 to a learning mode, which records the motions of the vehicle during a particular task. Then, an operator later executes the recorded sequence of motions to exactly repeat the task. For example, programs corresponding to loading and unloading sequences for particular missiles, bombs, or other devices at particular receptacles of particular aircraft can be created, stored and executed to partially automate and speed the ordinance handling processes, while significantly reducing chances of error or mishap. Motion control systems are discussed further herein with reference to FIG. 24.

Figure 13:
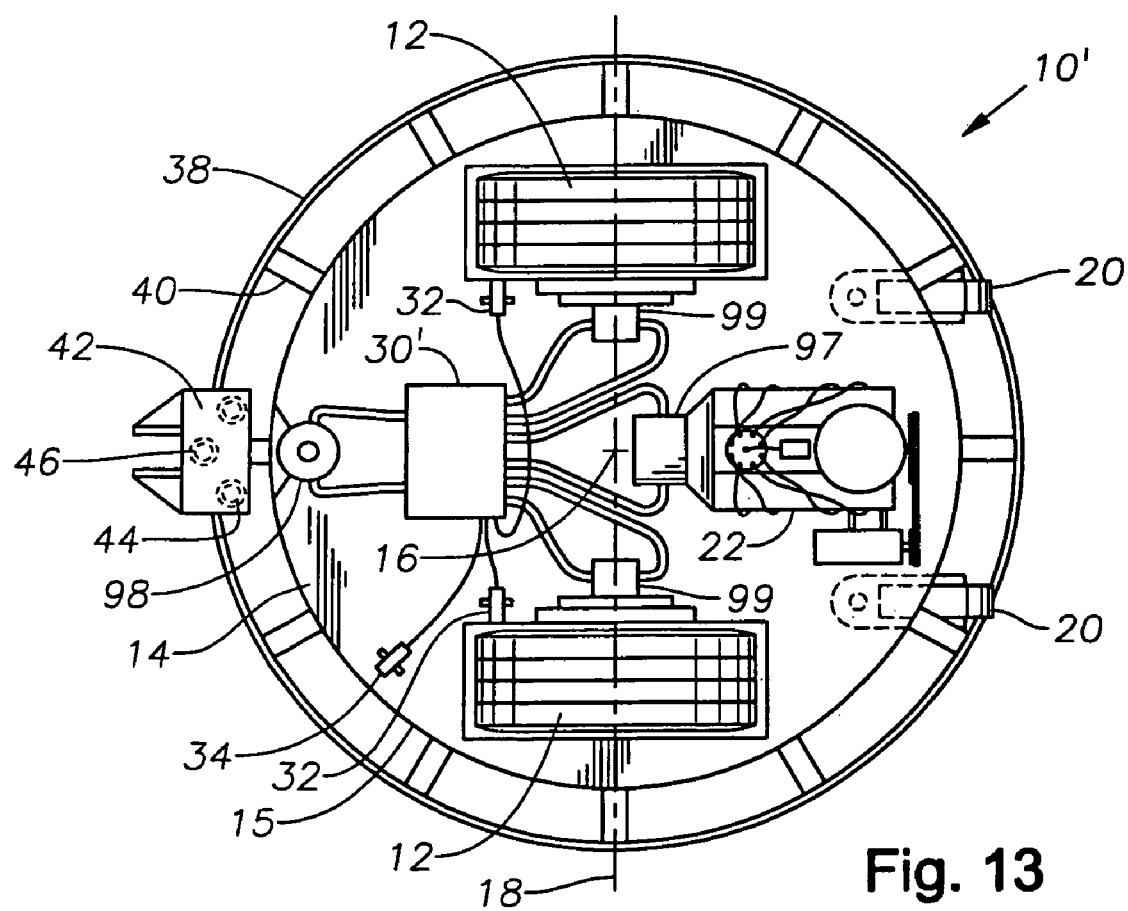
FIG. 13 shows an alternative arrangement of the ODV of FIG. 1, showing hydraulic drive and motion components in place of electric drive and motion components.
Figure 14:
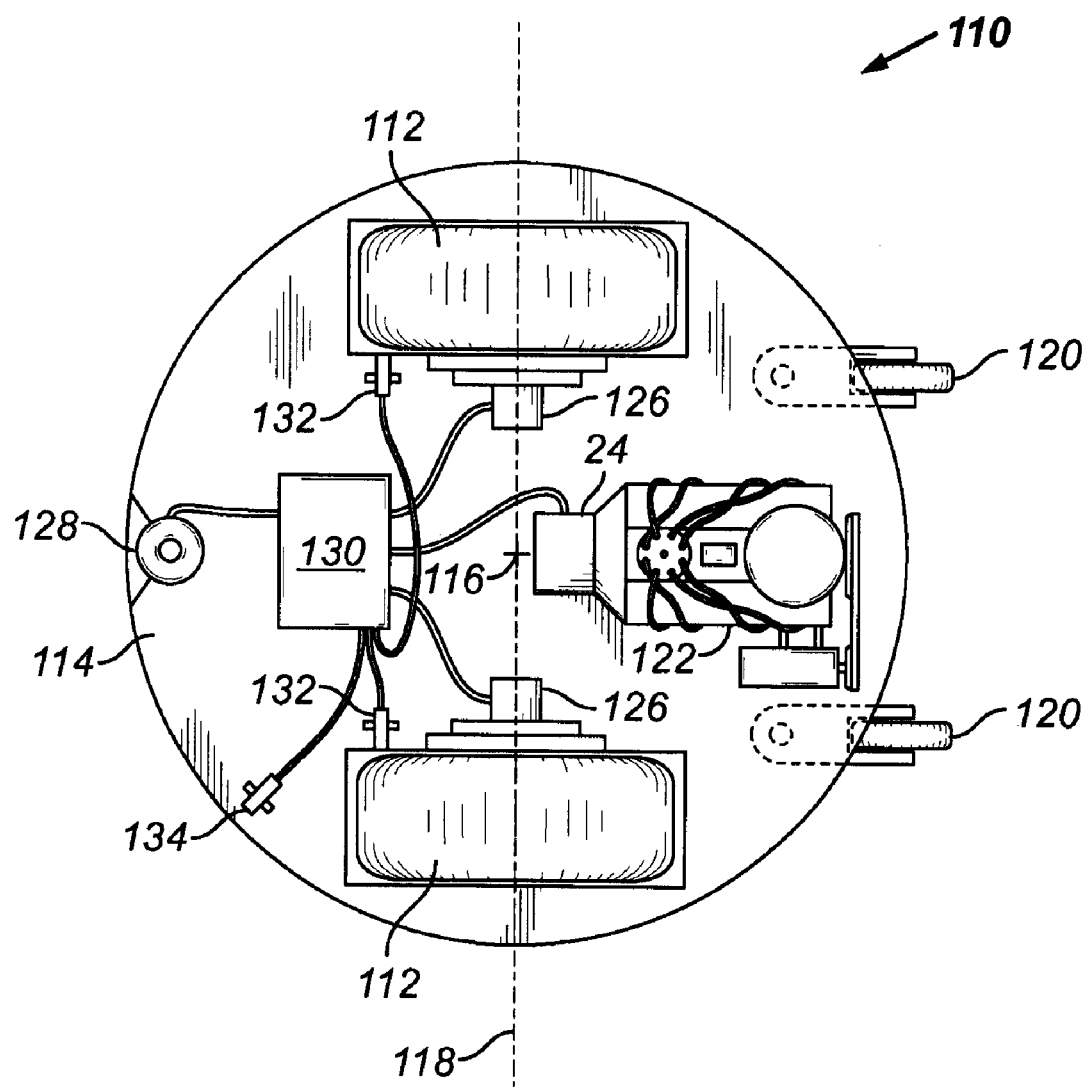
FIG. 14 is a horizontal view taken looking down along lines 14-14 of FIG. 16 into a second embodiment of an ODV according to the invention showing major drive components and a computer numerical control system.

FIG. 13 illustrates an alternate embodiment of the vehicle 10' according to the invention. The ODV 10' of FIG. 13 is identical to the ODV 10 of FIG. 1, except that the power source 22 drives a hydraulic pump 97 instead of an electric generator 24. Electric drive motors 26 are replaced by hydraulic motors 99, and electric turret motor 28 is replaced by hydraulic motor 98. Preferably, electric ordinance handling mechanism 60 actuators 69 (FIG. 2) are replaced by hydraulic actuators (not shown). The hydraulic pump 97 provides balanced pressurized hydraulic fluid to the two separate hydraulic motor assemblies 99, one for each drive wheel 12, and optionally to the turret motor 98 and/or other actuators. The speed and direction of rotation of hydraulic motors 99 and the drive wheels 12 driven thereby is controlled by a control system 30' which ports hydraulic fluid to the hydraulic components. The control system 30' receives powered hydraulic fluid from pump 97 and ports the fluid to hydraulic drive motors 99 and turret motor 98 as directed by the control circuitry based on control and feedback inputs.

Although ODV 10 is described herein as adapted for handling aircraft and ordinance, the vehicle may be suitable for use anywhere where precise 2, 3, 4, or more axis positioning is required. The invention thus includes as embodiments vehicles which may substitute for smaller cranes, boom trucks, cherry pickers, etc.

FIGS. 14-24 illustrate a munitions-handling ODV 110 according to a second embodiment of the invention. ODV 110 of FIGS. 14-24 is similar to ODV 10 of FIGS. 1-3 except that ODV 110 is not equipped with a trolley for pushing or towing vehicles. Referring to FIGS. 14-20, ODV 110 includes a power source 122 driving a generator 124 and a control system 130. ODV 110 is electrically powered by generator 124, but it may alternatively be powered by one or more batteries (not illustrated), which may be independent or may be charged by the generator 124. ODV 110 further includes two drive wheels 112 rotatively mounted on a frame 114. The drive wheels 112 are mounted along a horizontal axis 118. A vertical axis 116 intersects the horizontal axis midway between the two drive wheels 112. Left and right control levers 131 operate to control the left and right drive wheels 112, respectively. Each lever has a neutral position, such that when a lever is at such neutral position, a wheel associated with that lever is freewheeled or braked. If a lever is moved forward, the corresponding drive wheel 112 is driven in the forward. Likewise, if a lever 131 is moved backward, the corresponding drive wheel 112 is driven in reverse. The greater distance that a lever is moved from its neutral position, the faster the associated drive wheel 112 turns.

If both levers 131 are moved in the same direction and amount and at the same time, both drive wheels 112 move at the same speed, thereby causing straight-ahead movement of the ODV 110 over the ground. That movement is perpendicular to the horizontal axis 118. If the levers 131 are pushed forward or backward at an unequal distance from each other, the lever 131 moved the greater distance will produce a greater speed of rotation, causing the vehicle 110 to turn in the direction of the slower drive wheel 112. For example, if the right control lever 131 is pushed farther forward than is the left lever 131, the ODV 110 turns to the left, and vice versa.

If the right lever 131 is moved forward and the left lever 131 is moved backward and both lever positions are the same in amount and opposite in direction, the left wheel 112 turns backward and the right wheel 112 turns forward, both at the same rate of rotation. In this instance, the ODV 110 turns in its own space or footprint while its footprint generally remains stationary over ground, i.e., the ODV rotates about the vertical axis 116. The counter-clockwise rotation described above becomes a clockwise rotation when the right wheel 112 rotates backward at the same rate as the forward rotation of the left wheel 112.

As illustrated in FIGS. 16, 17, 19 and 20, two swivel wheels or castors 120 are ideally mounted to frame 114 at the rear of the vehicle 110. The rear castors 120 provide support for balancing the weight of the vehicle and its load to keep the frame 114 substantially level. Although ODV 110 is illustrated as having two swivel casters 120, any number of swivel castors may be employed at varying points along the frame 114, depending on the weight distribution and application of vehicle.

The ODV 110, as illustrated in FIGS. 15-20, preferably has a turret 136 revolvably coupled to frame 114 for rotation about vertical axis 116 and an ordinance handling mechanism 160 pivotably attached to the turret 136. Ordinance handling mechanism 160 generally defines central axis 117 (FIG. 18) that lies in a radial direction from vertical axis 116. As turret 136 revolves about vertical axis 116, the radial direction of the ordinance handling mechanism axis 117 likewise changes. Turret 136 is coupled to frame 114 using turret rollers similar to turret rollers 45 of FIGS. 4-5, for example. The ordinance handling mechanism 160 includes a U-shaped primary boom 161 that is pivotably connected to the turret 136, a secondary boom 163 that is pivotably connected to the primary boom 161 at the apex of the U-shape, and a carrier assembly 165 that is telescopically connected to the distal end of the secondary boom 163. The carrier assembly includes an ordinance cradle 172 which is designed and arranged for handling desired munitions. Although a U-shaped ordinance handling mechanism 160 is described and illustrated, other configurations such as wye-shaped, yoke, wishbone, or other suitably shaped arms may be used. Furthermore, ordinance handling mechanisms that do not pivot about a horizontal axis as such, for example, a scissors jack assembly, piston jack, etc., may be used as appropriate.

The ordinance handling mechanism 160 is preferably articulated so that it may be folded to minimize the ODV footprint when stowed. Thus, the primary boom 161 is defined by two lower arms 166 joined to a U-shaped upper arm 170 by two hinges 168. Each hinge 168 is designed so that mating ends of lower arm 166 and upper arm 170 abut when the arms are unfolded so that upper arm 170 is supported when extended in the operating position. One or more boom stowage actuators 167 (FIGS. 15-17) are preferably provided for facilitating folding and unfolding of the articulated ordinance handling mechanism 160. The lower arms 166 are preferably pivotably coupled to the turret 136 by two trunnion pins 162. Primary boom linear actuators 169, for example, lead screws driven by servo or stepper motors, control pivoting of the ordinance handling mechanism 160 about trunnion pins 162. The actuators 169 are preferably electric and capable of incremental and precise positioning, but other actuators, for example, hydraulic actuators may be used. The ordinance handling mechanism is preferably disposed such that the operator's seat 150 is located within the U-shaped primary boom 161 both when the upper arm assembly is folded in the stowed position and unfolded in the operating position.

The secondary boom 163 is preferably pivotally mounted to the primary boom at the apex of the U-shape. Pivoting of the secondary boom 163 is controlled by two servo or stepper motors 121, each equipped with a self-locking parallel shaft worm gear speed reducer or a similar brakeable mechanism. Thus, the secondary boom 163 will pivot only when driven by the motors 121 and will not pivot due to load forces acting thereon. Preferably, the secondary boom 163 can pivot 90 degrees between the horizontal and vertical positions as shown by arrow 164 in FIG. 19.

The secondary boom 163 preferably includes one or more telescopic linear actuators 123 which are in turn connected to the carriage assembly 165. The ODV 110 is shown in FIGS. 15-20 equipped with a secondary boom having two telescopic liner actuators 123 which are rigidly attached together and operate in unison for added strength. Each telescopic linear actuator includes an outer rail 125 pivotally mounted to the primary boom 161 and an inner rail 127 which slides within the outer rail. Intermediate rails may also be included for extended reach. Each telescopic linear 123 actuator is ideally actuated by either a ball lead screw assembly or a rack and pinion 124 (FIG. 20) disposed within inner rail 127 and driven by a servo or stepper motor 129. Alternatively, other arrangements may be used as appropriate. The telescopic feature of the secondary boom allows fine translation of the carrier assembly and its ordinance cradle in the longitudinal direction of the secondary boom 163 as depicted by hidden lines 172' in FIG. 20.

Figure 15:
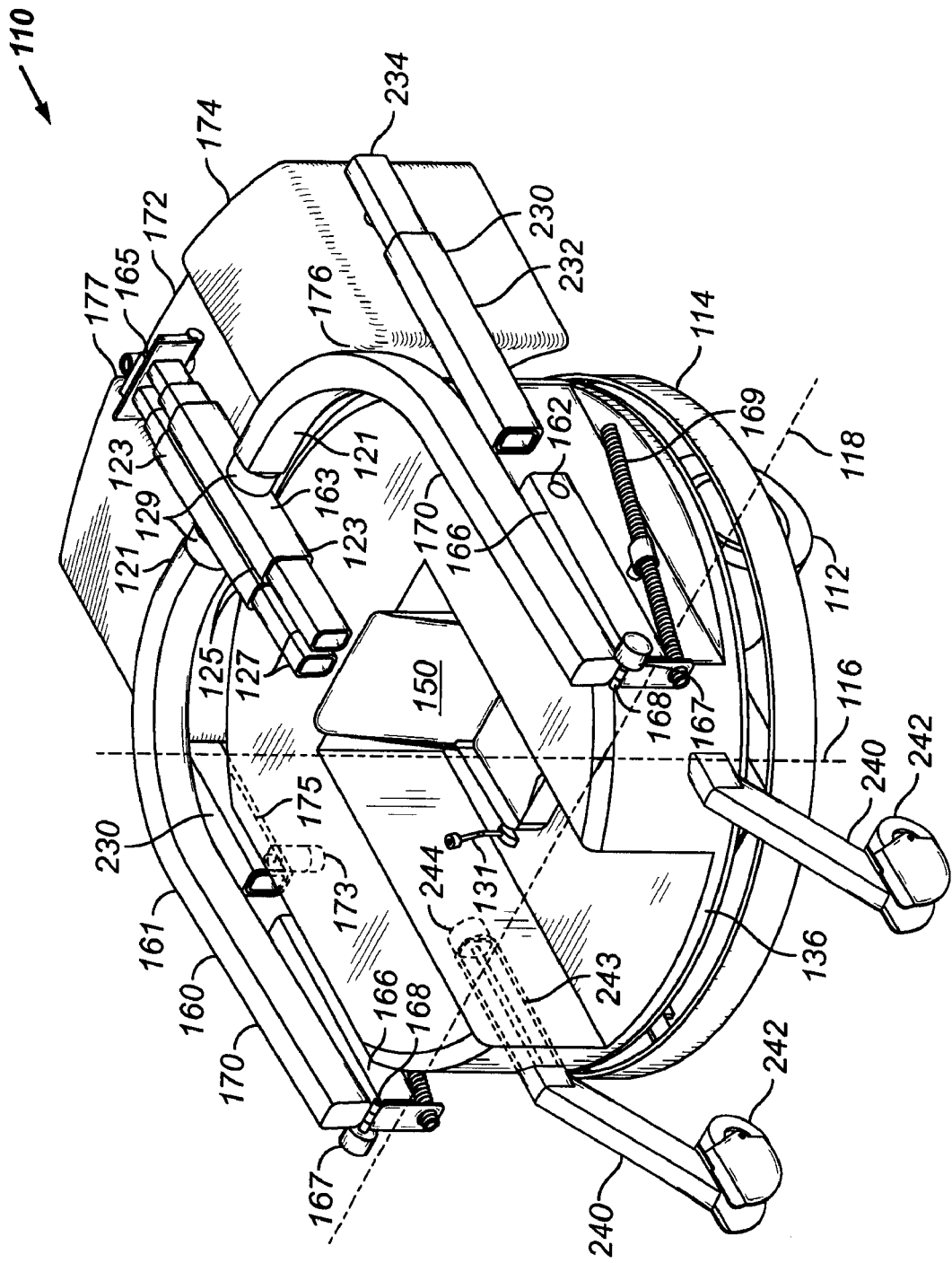
FIG. 15 is a perspective view of a second embodiment of an ODV according to the invention showing a circular vehicle frame with an upper turret revolvably mounted thereto, an articulated ordinance handling arm folded in the stowed position, a counterweight mounted to the turret by telescoping arms, and telescoping outriggers mounted to the turret for support of the vehicle.
Figure 18:
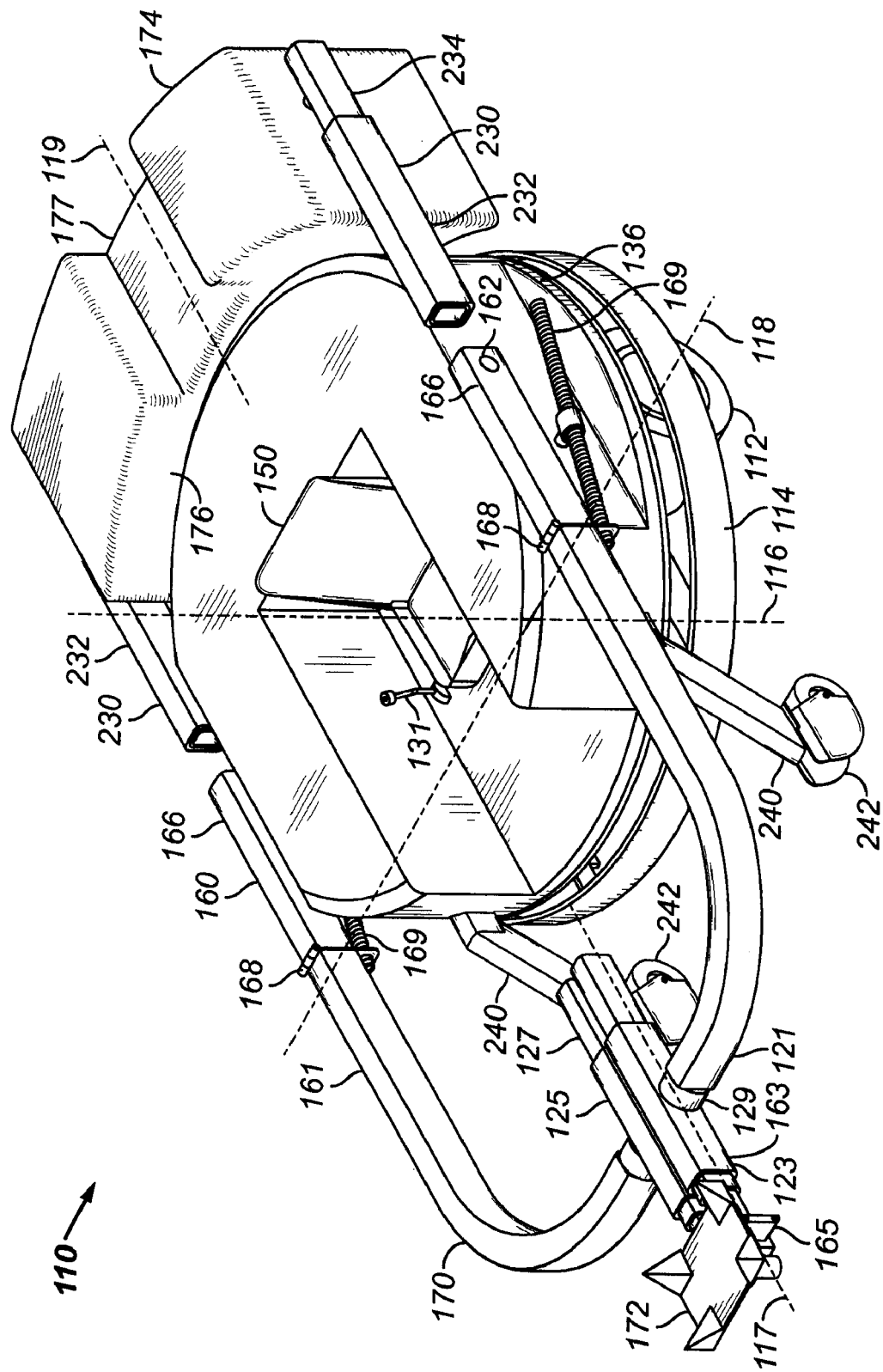
FIG. 18 is a perspective view of the ODV of FIG. 15 arranged with the U-shaped ordinance handling arm in an unfolded operable position.
Figure 19:
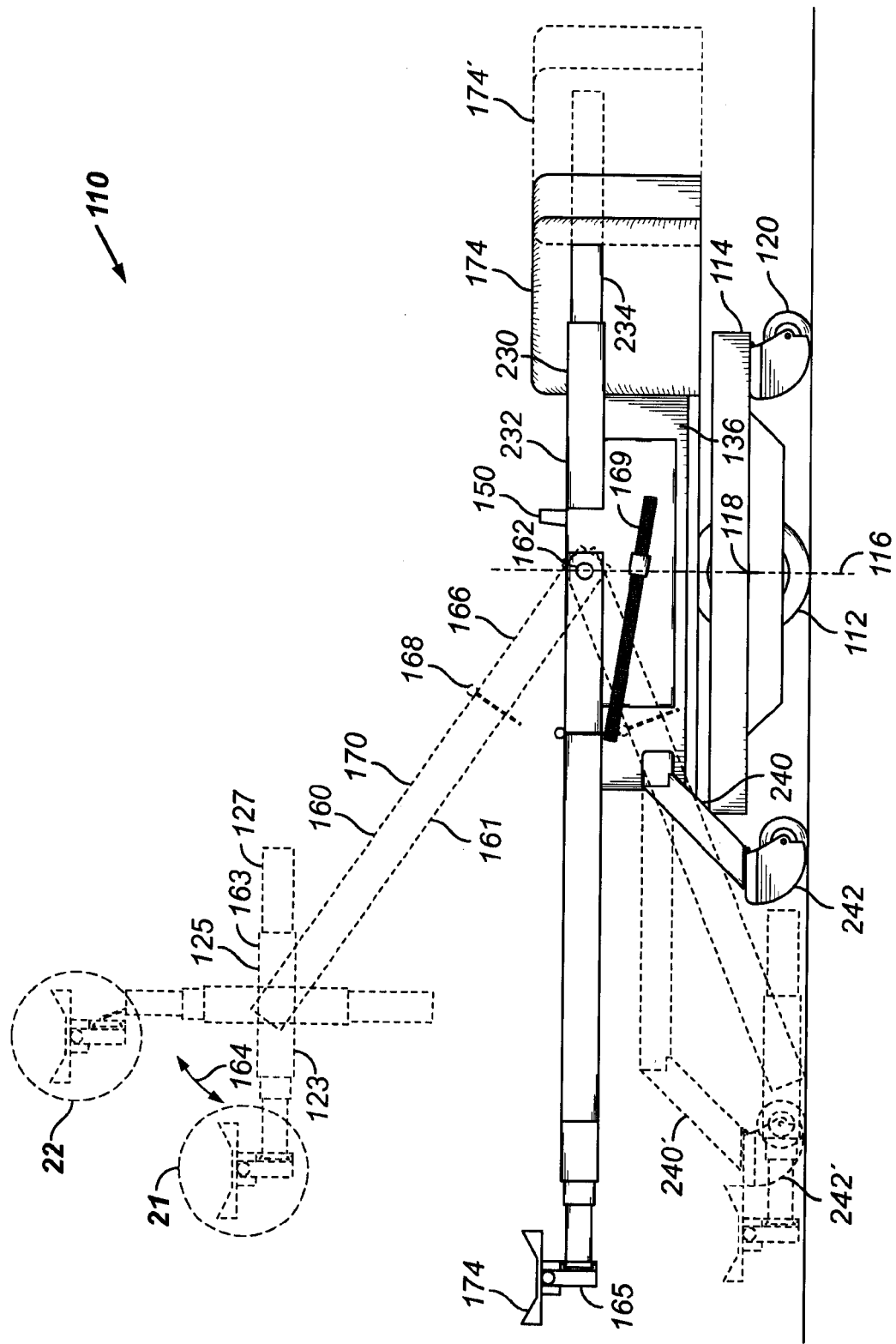
FIG. 19 is a side view of the ODV of FIG. 18, illustrating x-axis telescopic movement of the counterweight and outriggers and the pivotable movement both at the elbow joint (at the apex of the U-shaped portion) and at the shoulder joint (at the turret trunnion) of the ordinance handling arm.
Figure 20:
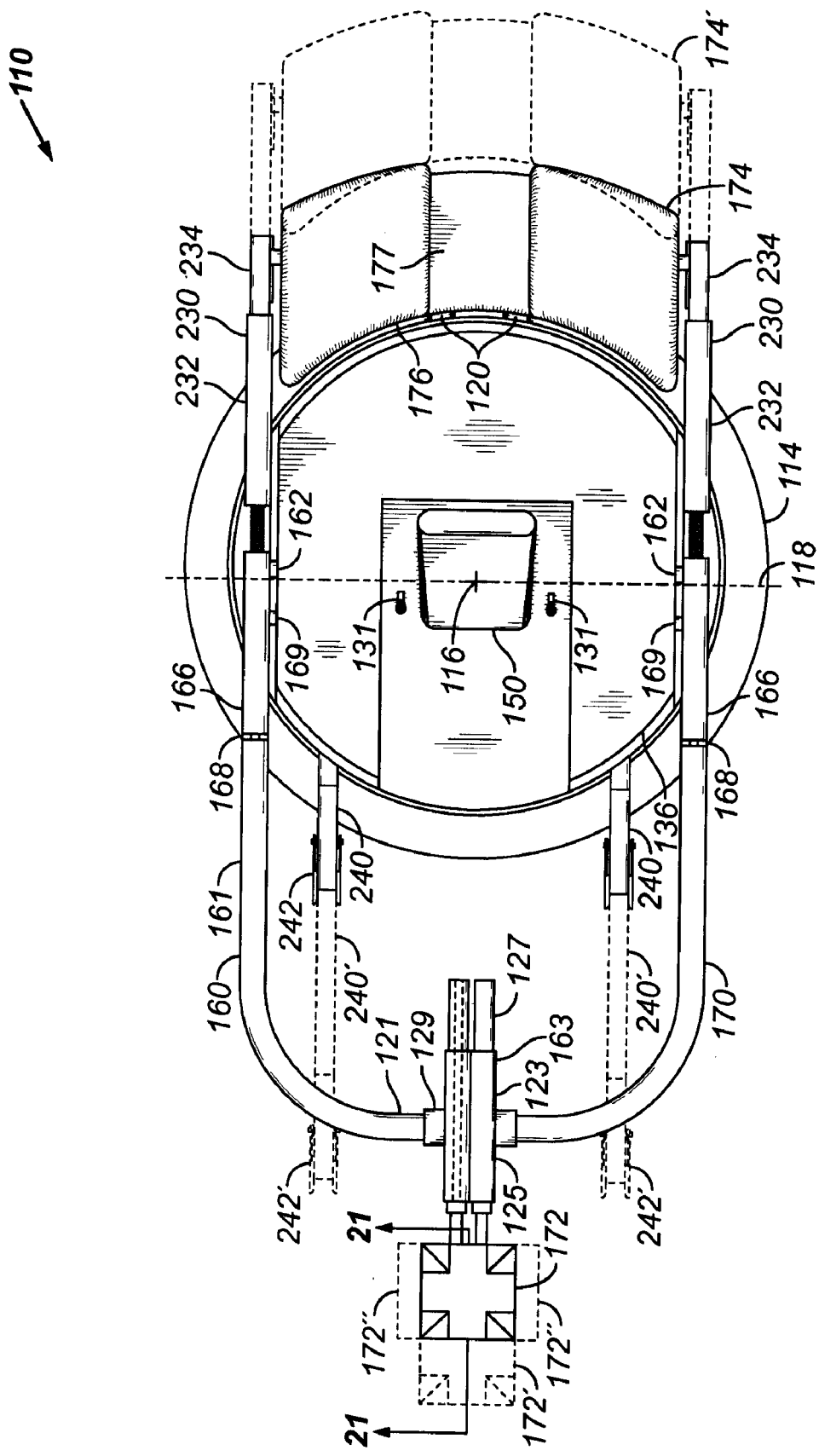
FIG. 20 is a top view of the ODV of FIG. 18 illustrating x-axis telescopic movement of the counterweight, the outriggers and the forearm portion of the ordinance handling arm and y-axis translation of the ordinance cradle.

A counterweight assembly 174 is preferably movably attached to the turret 136 opposite the cradle 172 (when unfolded as shown in FIGS. 18-20) to balance the weight of a weapon held in cradle 172. Counterweight 174 defines a generally central axis 119 (FIG. 18) that lies in a radial direction from vertical axis 116 that is 180 degrees opposite to the radial direction in which ordinance handling mechanism axis 117 lies. Counterweight 174 is ideally attached to turret 136 by two telescopic linear actuators 230 that move counterweight 174 closer to or further from vertical axis 116 in response to loading or positioning of ordinance cradle 172 to maintain the vehicle's center of gravity over frame 114. Thus, as cradle 172 is loaded or extended outwardly by repositioning ordinance handling mechanism 160, counterweight 174 is concurrently moved to an outward position, as shown by the dashed representation 174' in FIGS. 19-20, to balance the vehicle 110. Similarly, as the cradle 172 is unloaded or retracted, counterweight 174 is concurrently moved to an inward position as shown by the solid lines in FIGS. 19-20. Counterweight 174 may have a concavity 176 to accommodate turret 136 to provide a close-fitting innermost position. Counterweight 174 may also include a recess 177 to accommodate ordinance cradle 172 when ordinance handling mechanism 160 is folded in a stowed position. Each linear actuator 230 preferably includes an outer rail 232 and an inner rail 234 slideably received therein and positioned by an internal lead screw assembly or rack and pinion 175 driven by a servo motor or stepper motor 173 (FIG. 15). However, other suitable actuator mechanisms may be used. Because both counterweight 174 and ordinance handling mechanism 160 are both connected to turret 136, the munitions load is always balanced by counterweight 174 regardless of the orientation of turret 136 with respect to frame 114.

Figure 16:
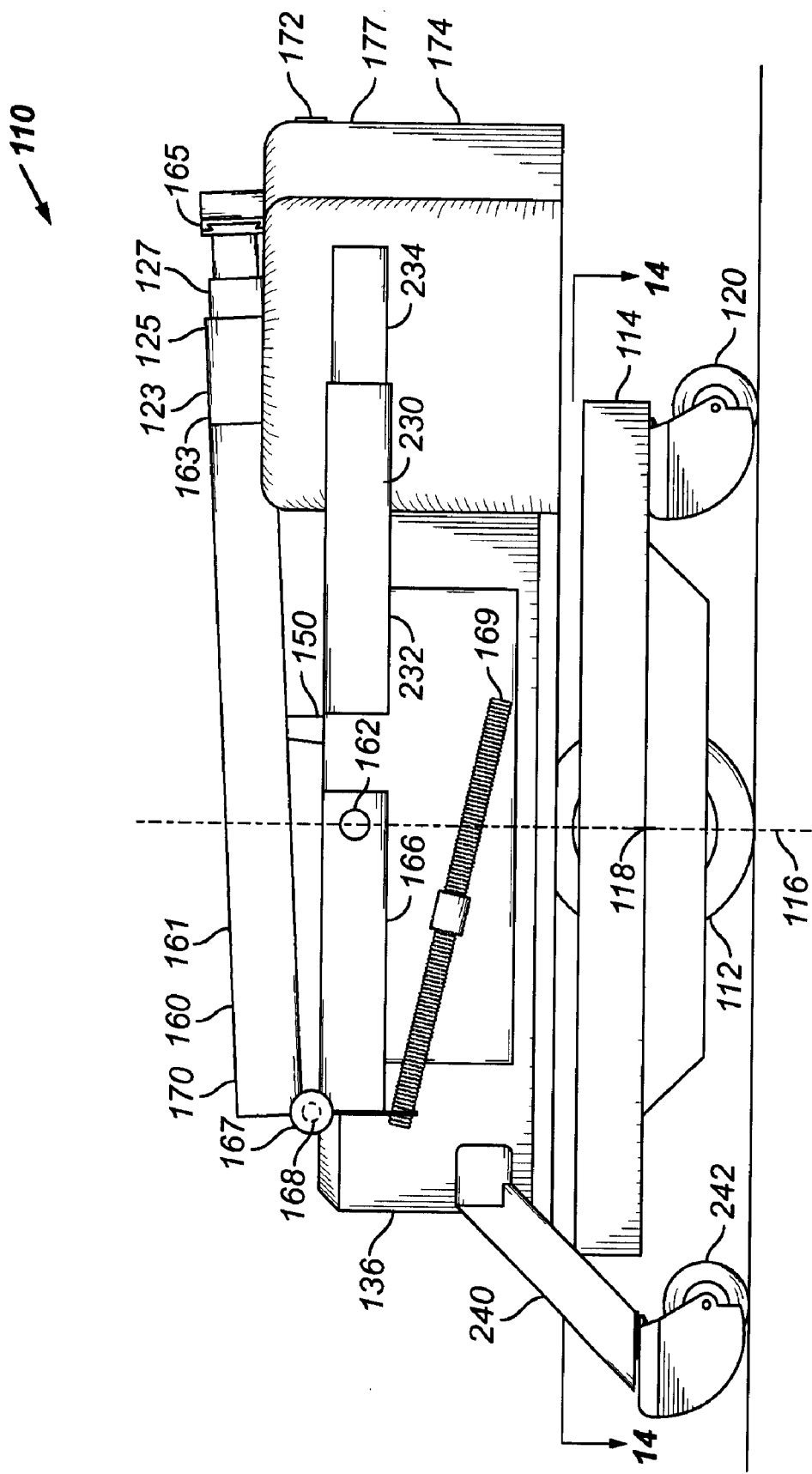
FIG. 16 is a side view of the ODV of FIG. 15 showing the telescoping counterweight and the telescoping outriggers disposed in the inward positions.
Figure 17:
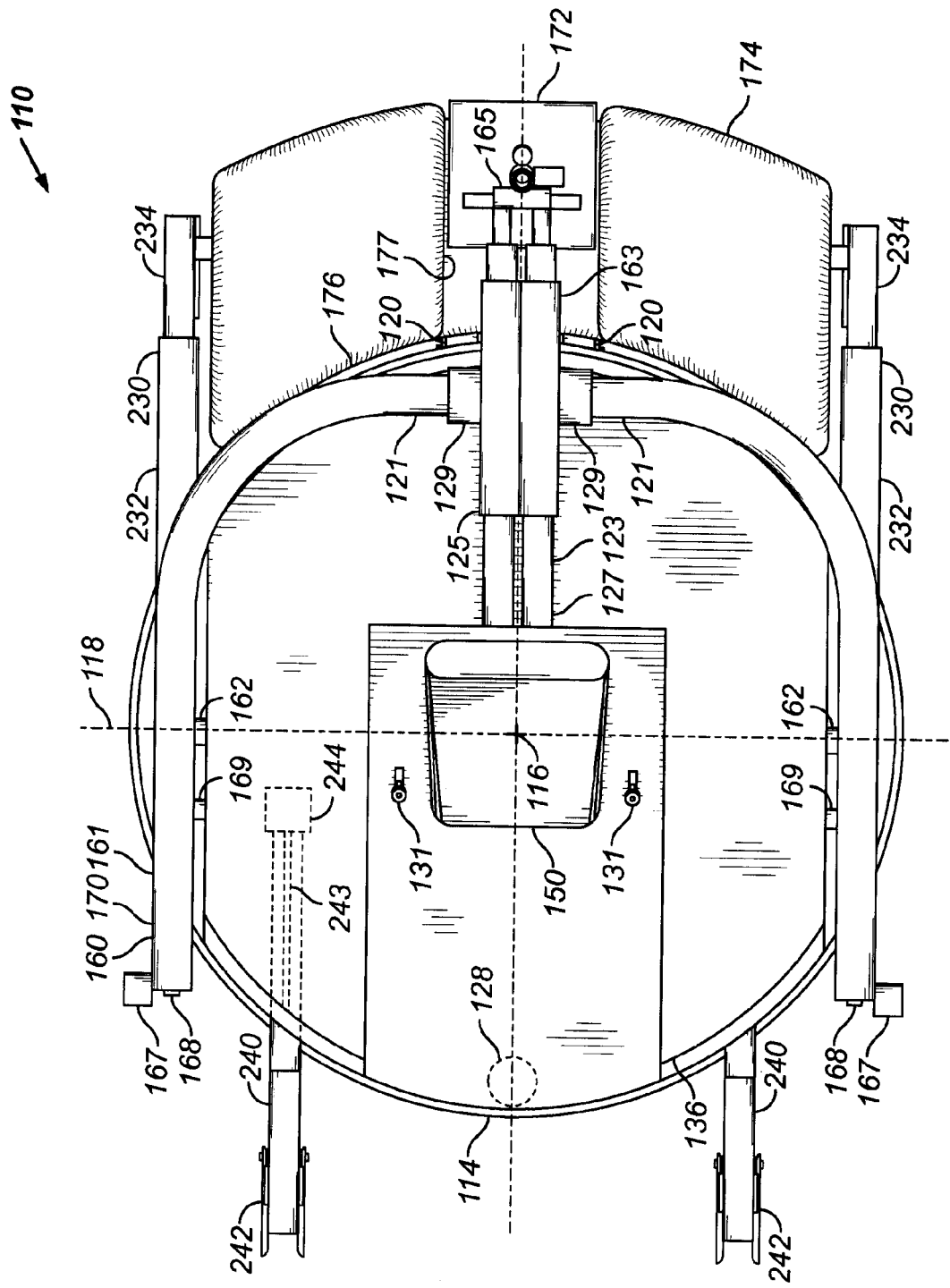
FIG. 17 is a top view of the ODV of FIG. 15 showing a pivotable and slidable ordinance cradle telescopically connected at the elbow joint (at the apex of the U-shaped portion) of the ordinance handling arm.

In addition to or in place of the counterweight 174, one or more extendable outriggers 240 may be used to support vehicle 110 during munitions loading operations. The outriggers are preferably coupled to turret 136 generally underneath upper arms 170 of primary boom 161 when ordinance handling mechanism 160 is in its unfolded operable position. Each outrigger 240 preferably terminates in a swivel caster 242. Because both outriggers 240 and the ordinance handling mechanism are connected to turret 136, the munitions load is always supported by outriggers 240 regardless of the orientation of turret 136 with respect to vehicle frame 114. Each outrigger 240 is preferably extendable and retractable as illustrated in FIGS. 19-20, moved by a linear actuator with a lead screw assembly or a rack and pinion assembly 243 and servo or stepper motor 244 (FIGS. 15, 17). Thus, as shown in FIGS. 15-17, outriggers 240 are preferably retracted into a storage position when the ordinance handling mechanism 160 is folded to minimize the vehicle footprint, and outriggers 240 are preferably extended into an operating position as shown by dashed lines 240' in FIGS. 19-20 to support the vehicle 110 during munitions handling operations.

Figure 21:
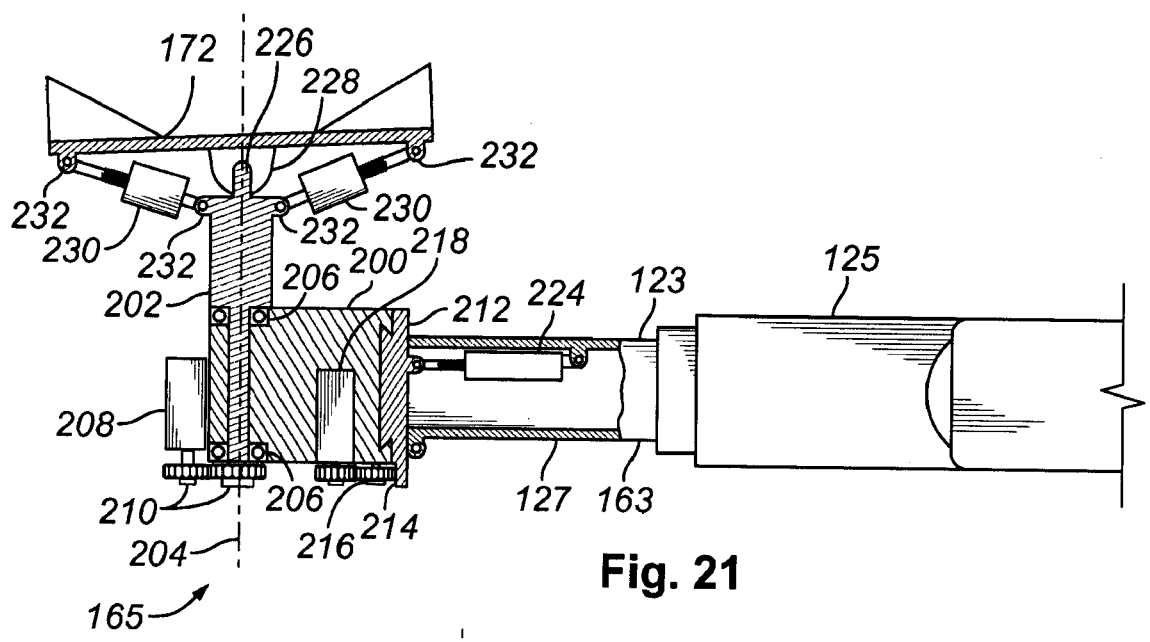
FIG. 21 is an enlarged side view cross section of the ordinance carriage assembly of FIG. 18 taken along lines 21-21 of FIG. 20.
Figure 22:
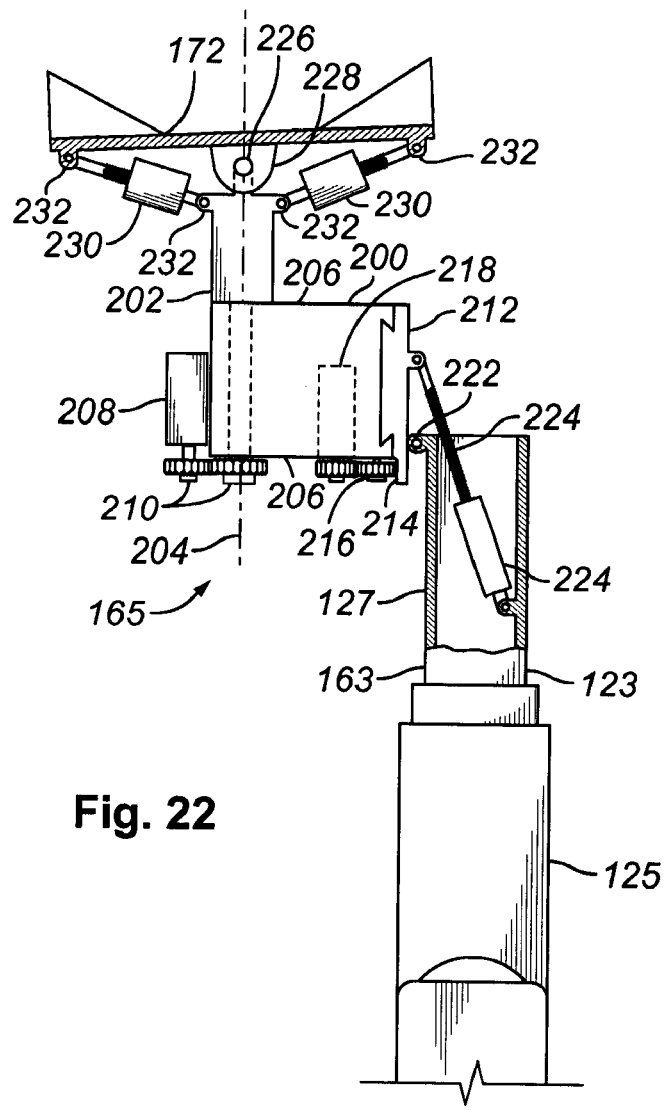
FIG. 22 is an enlarged side view of the ordinance carriage assembly of FIG. 19 shown with the secondary beam oriented in a vertical position.
Figure 23:
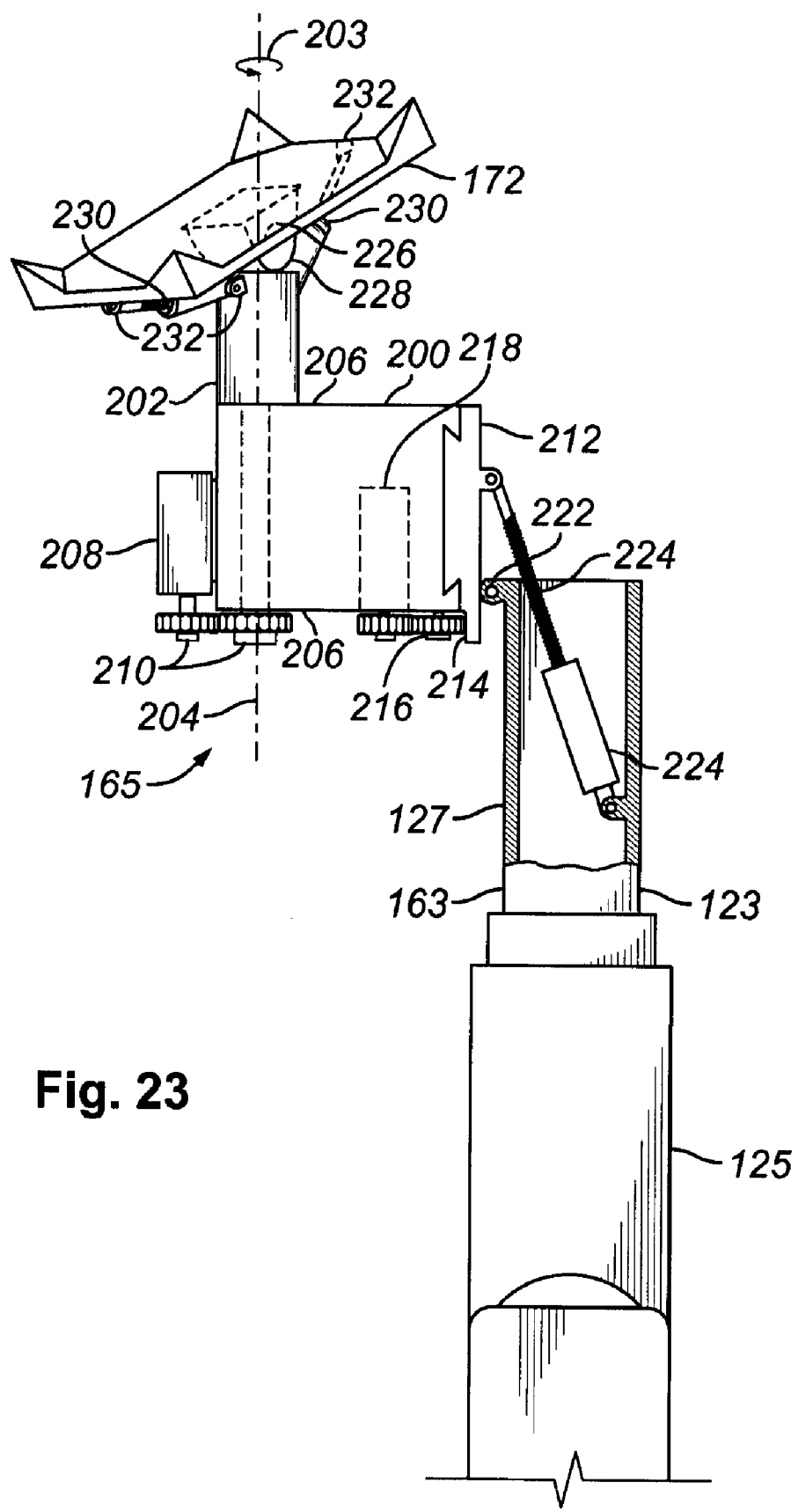
FIG. 23 is a side view of the ordinance carriage assembly of FIG. 22 shown with the ordinance cradle angled and rotated from the orientation illustrated in FIG. 22.

FIGS. 21-23 show detail of the ordinance carriage assembly 165. Carriage assembly 165 is used to support and precisely position the ordinance cradle 172. In one embodiment, the carriage assembly 165 includes a journal box 200 and journal 202 which supports cradle 172. Journal 202 rotates along axis 204 within journal 200. Bearings 206 are preferably provided for smooth rotation of journal 202 in journal box 200 under the forces of a loaded cradle 172. A rotary actuator 208, for example, a servo or stepper motor, is connected to journal 202 for controlling the angular position of journal 202 with respect to journal box 200. Although actuator 208 is shown coupled to journal 202 using spur gears 210, the actuator 208 may be coaxially located in journal 200 and directly engage journal 200, if desired. Alternatively, other arrangements may be used. Thus, ordinance cradle 172, and any munitions carried thereby, can be precisely rotated along vertical axis 204 for fine positioning of the weapon under the wing of an aircraft, for example. FIG. 23 illustrates journal 202 rotated approximately twenty degrees counterclockwise (when viewed from above as depicted by arrow 203) about axis 204 from the journal position of FIGS. 21-22.

Referring to FIGS. 21-23, journal box 200 is ideally connected to a cross slide plate 212, which is in turn connected to the distal end of the inner rail 127 of linear actuator 123 of secondary boom 163. An actuator assembly 214, 216, 218 positions journal box 200 along cross slide plate 212. For example, the actuator assembly may include a rack 214 extending below cross slide plate 212 that engages a pinion 216 driven by a servo or stepper motor 218 (that is disposed in a recess in journal box 200). Thus, journal box 200 can slide transversely (with respect to the longitudinal orientation of secondary boom 163) along cross slide plate 212 and be precisely positioned by actuator assembly 214, 216, 218. The motion of cradle 172 due to the cross slide plate 212 and actuator assembly 214, 216, 218 is best seen in FIG. 20 by dashed lines 172".

Cross slide plate 212 is connected to inner rail 127 of telescopic actuator 123 by a hinge 222 and a by linear actuator 224 disposed within inner rail 127. Linear actuator 224 is preferably a ball lead screw actuator driven by a servo or stepper motor, although other suitable actuators may be used. Actuator 224 controls the pivoting position of cross slide plate 212 about the pin of hinge 222. Thus, as the secondary boom 163 of a loaded ordinance handling mechanism 160 is pivoted in the direction of arrow 164 (FIG. 19) from a horizontal orientation (view 21 of FIG. 19) to a vertical orientation (view 22 of FIG. 19), linear actuator 224 can extend to continually maintain cross slide plate 212 in a vertical orientation (and thus keep cradle 172 in a horizontal position) as shown in FIG. 22.

Cradle 172 may optionally be pivotably connected to the top of journal 202. For example, the upper portion of the journal forms a horizontal shaft 226 about which a pillow bearing block 228 pivots. The cradle 172 is mounted to the pillow bearing block 228. One or more linear actuators 230, e.g., lead screw actuators driven by servo or stepper motors, are coupled between cradle 172 and journal 202. Journal 202 and cradle 172 include padeyes 232 or similar mounts to accommodate cradle linear actuators 230.

Vehicle 110 includes a control system 130 (FIG. 14) that is preferably computer controlled and operates all vehicle actuators and motors. Control system 130 is preferably designed and arranged using common industry Computer Numerical Control (CNC) technology so that tasks requiring precise motion control of complex combinations of multi-axis movements can be repetitively performed. Numeric controls may allow complete automation or simply augmentation of operator skills. However, control system 130 preferably provides a manual override capability as well.

Figure 24:
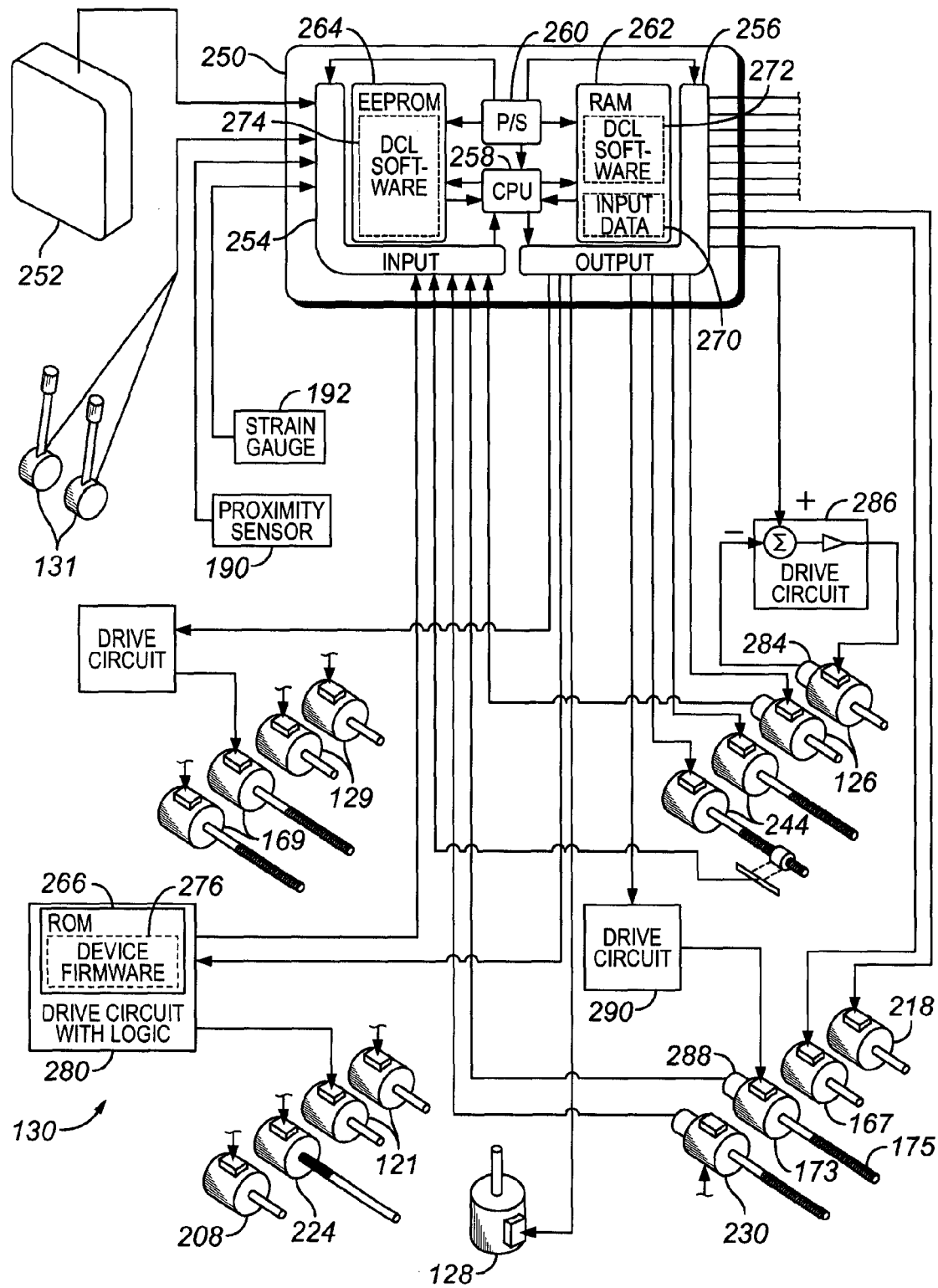
FIG. 24 is an illustration depicting the numerically controlled motion control system of the ODV of FIGS. 14-23.

Referring to the schematic diagram of FIG. 24, control system 130 includes a programmable logic controller (PLC) 250, operator controls 252, hand levers 131, various actuators and other appropriate electromechanical position, speed, acceleration, and/or strain sensors, etc., for feedback. In the preferred embodiment, control system 130 controls two drive wheel motors 126 that are mechanically coupled to drive wheels 112 (FIG. 14), a turret motor 128 for rotating turret 136 about vertical axis 116 (FIG. 14), ordinance handling mechanism pivot actuators 169, a boom storage actuator 167 that folds and unfolds articulated primary boom 161 (FIGS. 15-20), outrigger extension actuators 244 for extending and retracting outriggers 240 (FIGS. 15-20), a counterweight extension motor 173 for positioning counterweight 174 (FIGS. 15-20), secondary boom extension motors 129, secondary boom pivot motors 121, cross slide plate translation motor 218, cradle rotation motor 208, cross slide plate pivot linear actuator 224, and optional cradle pivot actuators 230. Ideally, all of these electric devices are capable of precise positioning and numerical supervision.

Standards for CNC hardware and software have been developed by many organizations, including Electronic Industries Association (EIA) (2001 Pennsylvania Avenue NW, Washington, D.C. 20006), American Society of Mechanical Engineers (ASME) (345 East 47th Street, New York, N.Y. 10017), American National Standards Institute (ANSI) (II West 42nd Street, New York, N.Y. 10017), National Standards Association, Inc. (NSA), (1200 Quince Orchard Boulevard, Gaithersburg, Md. 20878), and The Association for Manufacturing Technology (7901 Westpark drive, McLean, Va. 22102), among others. The following industry standards for CNC technology are incorporated herein by reference: ANSI/CAM-I 101-1990; ANSI/ASME B5.50, B5.54-1990, and B89.1.12M; ANSI/EIA 227-A, 232-D, 267-B, 274-D, 358-B, 408, 432-A, 431, 441, 449, 484, 491-A-1990, and 494; EIA AB$_3$-D and Bulletin 12; ANSI X 3.94, X 3.37, X 3.20, and X 3.82; ISO 841, 2806, 2972, 3592, 4336, 4343, TR 6132, 230-1, and 230-2; and NAS 911, 912, 913, 914, 960, 963, 970, 971, 978, 990, 993, 994, and 995.

Referring to FIG. 24, programmable logic controller (PLC) 250 preferably includes input handling circuitry 254, output handling circuitry 256, a central processing unit (CPU) 258, a power supply 260, volatile memory 262, and non-volatile memory 264. The CPU 258 scans the status of the input devices continuously via the input circuitry 254, correlates the received input with the control logic in the memory 262, 264, and produces the appropriate output responses needed to control the vehicle via the output circuitry 256. Power supply 260 contains power conditioning circuitry that receives power from generator 124 (FIG. 14) and supplies power to the input and output (I/O) circuitry 254, 256, the CPU 258, and the memory 262, 264. The PLC 250 preferably has the memory capacity and functional capabilities of at least a small computer and can also handle mathematical functions, generate reports, and maintain high-level communications.

Input to PLC 250 may be in either discrete or continuous form, or a combination of both. Discrete inputs may come from push buttons, micro switches, limit switches, photocells, proximity switches, shaft encoders, optional scales, or pressure switches, for instance. Continuous inputs may come from sources such as strain gauges, resolvers, thermocouples, transducers, resistance bridges, potentiometers, or voltmeters. Outputs from PLC 250 are generally directed to actuating hardware such as solenoids, solenoid valves, motor starters, and servo or stepping motor drive circuitry. PLC 250 examines the status of a set of inputs and, based on this status and instructions coded in digital control logic software, actuates or regulates a set of outputs. PLC 250 preferably has a sufficient number of input and output channels in I/O circuitry 254, 256 to control all movements of vehicle 110.

The CPU is preferably a microprocessor or microcontroller, although discrete special-purpose electronic logic circuits may be used. PLC 250 word size may range from 8 to 64 bits, depending on the vehicle design requirements, but the CPU 258 and memory 254, 256 are preferably capable of processing words of sufficient size at a sufficient speed so as to accurately and simultaneously control all the degrees of freedom of vehicle 10 in real time.

PLC 250 ideally includes both random access memory (RAM) 262, which due to its relative ease of programming and editing, is primarily used to store input data 270 and frequently changing digital control logic software 272, and electronically erasable programmable read-only memory (EEPROM) 264, which retains its logic without power. EEPROMs are preferable to store digital control logic software 274 that is expected to be infrequently changed.

Control system 130 may also include read-only memory (ROM) 266. ROM chips, which cannot be reprogrammed, are preferred to store low level interface software programs, often referred to as firmware 276, that contain specific instructions to allow the higher level digital control logic software to access and control a specific piece of equipment, e.g., sophisticated motor drives 280. Because such low-level hardware-dependent software is intimately tied to the device it controls, ROM is often collocated with its device.

Control system 130 may include open-loop control, closed-loop control, or a combination of both. In open-loop control, control system 130 issues commands to the drive motors or actuators of vehicle 110, but control system 130 has no means of assessing the results of these commands; no provision is made for feedback of information concerning movement of a slide or rotation of a lead screw, for example. Because a stepper motor rotates by a specific number of degrees in response to an electrical input pulse, it is essentially an electromagnetic incremental actuator that can convert digital pulse inputs into analog output shaft motion and is therefore ideal for use in digital motion control system. Thus, stepping motors are popular as drives for open-loop systems, because neither position sensors nor feedback systems are normally required for the stepper motors to make the output responses follow the input commands.

FIG. 24 illustrates a typical open-loop control arrangement. An ordinance handling mechanism pivot actuator 169 is shown as a DC stepper motor with a direct coupled lead screw shaft extension. Stepper motor 169 may be a single-stack or a multi-stack reluctance stepper motor or a permanent magnet stepper motor, for example. Permanent magnet stepper motors have higher inertia and lower acceleration than variable reluctance stepper motors, but they produce more torque per ampere of stator current than a variable reluctance stepper motor. Variable reluctance motors can have a maximum pulse rate as much as four times higher than a permanent magnet motor—up to 1200 pulses per second compared to a maximum of about 300 pulses per second for a permanent magnet stepper motor. Stepper motor 169 may commonly range from several steps per revolution to as many as 400 steps per revolution, for example. A stepper motor drive circuit 282 receives pulsed input from the output circuitry 256 of PLC 250 and converts the digital logic level signals to a current sufficient to power the stepper motor windings. Drive circuit 282 may be a unipolar or a bipolar drive circuit, for example. As stepper motors and stepper motor drive circuits are well known in the art, they are not discussed further herein. As the PLC 250 pulses the drive circuit 282, stepper motor 169 is caused to incrementally rotate in predetermined angular steps. No feedback mechanism exists to measure the effect of the PLC pulses.

FIG. 24 also illustrates a secondary boom pivot motor 121 controlled in open-loop fashion. Stepper motor 121 is driven by an intelligent drive circuit 280. In addition to the ordinary transistors and other power electronics for powering motor windings, drive circuit 280 includes read-only-memory (ROM) 266 and digital logic circuitry that communicates with PLC 250. Rather than PLC 250 generating each pulse to control stepper motor 121, drive circuit 280 generates the required pulses based on a higher level command signal from PLC 250. For example, PLC 250 needs only to provide coded start, stop and rate signals rather than generate individual pulses to arrive at a desired motor speed. Such distribution of control simplifies the PLC design requirements. No feedback mechanism exists to measure the output of stepper motor 121.

In closed-loop control, also referred to as feedback control, control system 130 issues commands to the motors and actuators and then compares the results of these commands to the measured movement or location of the driven component. The feedback devices normally used for measuring movement or location of the component are called resolvers, encoders, Inductosyn® transducers, or optical scales, and any of these, other suitable devices, or a combination thereof are preferably used in control system 130. The resolver, which is a rotary analog mechanism, is the least expensive, and has been the most popular since the first CNC machines were developed. Resolvers are normally connected to lead screws actuators. Linear measurement is derived from monitoring the angle of rotation of the lead screw and is quite accurate. Encoders also are normally connected to the lead screw of an actuator, but measurements are in digital form. Digital pulses in binary code form are generated by rotation of the encoder and represent angular displacement of the lead screw. As digital pulses are well suited to the digital CNC system, encoders have become very popular, notwithstanding their somewhat greater expense than resolvers. The Inductosyn® transducer (Inductosyn® is a trade name of Farrand Controls, Inc.) produces analog signals and may be attached to the slide or fixed part of a machine to measure the position of the table arm or other component. The Inductosyn® transducer provides almost twice the measurement accuracy of the resolver, but is considerably more expensive, depending on the length of travel to be measured. Optical scales generally produce information in digital form and, like the Inductosyn®, are attached to the slide or fixed part of the machine. Optical scale measurements are more accurate than either resolvers or encoders, and are suited to the digital CNC system. Like the Inductosyn®, optical scales are more costly than either resolvers or encoders. Additionally, other feedback servers such as strain gauges, etc., may be used.

Closed loop control is generally required for use of the servomotor. Servomotors, also referred to as servos, are electric motors that are specially designed for use as output actuators in feedback control systems. Either DC or AC servomotors may be used as appropriate. DC servomotors may be separately excited or permanent magnet motors. Servomotors typically have low inertia and a high speed of response. A DC servomotor is normally controlled by armature voltage. The armature of a DC servomotor is designed to have a large resistance so that the torque-speed characteristics are linear and have a negative slope for viscous damping. Thus, a step change in the armature voltage results in a quick change in the position or speed of the rotor.

FIG. 24 illustrates a typical closed-loop control arrangement for use with a servomotor. A drive wheel motor 126 is shown as a double-shafted servomotor with a resolver 284 directly connected to one shaft. A drive circuit 286 receives an analog signal from PLC 250 that is proportional to the desired output speed or position of servomotor 126. In response, drive circuit 286 outputs an armature voltage to servomotor 126 to produce the desired output speed or position. Resolver 284 measures the actual shaft speed or position of servomotor 126 and produces an analog signal which is negatively fed back to drive circuit 286. For example, if servomotor 126 shaft speed is too slow, drive circuit 286 increases the output armature voltage to the servomotor, and vice versa.

FIG. 24 also illustrates a second embodiment of a closed-loop feedback system for controlling a servomotor. Counterweight extension motor 173 is shown as a double-shafted servomotor with an encoder 288 directly connected to one shaft and a lead screw 175 connected to the other shaft. A drive circuit 290 receives an analog signal from PLC 250 that is proportional to the desired output speed or position of servomotor 173. In response, drive circuit 290 outputs an armature voltage to servomotor 173 to produce the desired output speed or position. Encoder 288 measures the actual shaft speed or position of servomotor 173 and produces a digital signal which is fed back to PLC 250. PLC 250 compares the speed or position feedback from encoder 288 to the desired output speed or position and changes the analog signal output by output circuitry 256 to drive circuit 290 as required to correct any speed or positional errors in the servomotor 173 output.

Control system 130 may also be capable of adaptive control, i.e., measuring performance of a process and then adjusting the numeric control parameters to obtain optimum performance. In other words, adaptive control is a means of adjusting the speed or position of a motor or actuator based on sensor feedback information directly representative of the quality of the process to maintain optimum conditions. For example, a proximity sensor 190 may be mounted to cradle 172 (FIGS. 15-20) and used to provide information such as the distance from the ordinance cradle 172 to a missile mount on the underside of an aircraft wing. This information is then used by control system 130 to analyze the munitions loading process and adjust the speeds of the drive motors to optimize vehicle 110 positioning. For control system 130 to effectively evaluate the process in real time, details and information about both vehicle 110 and environmental parameters must be integrated into the digital control logic software controlling the loading process. For instance, a strain gauge 192 may be mounted to primary boom 161 for measuring the forces on the ordinance handling mechanism (FIGS. 15-20). The strain gauge information may be used to control the position of counterweight 174 or outriggers 240. Additionally, upon detecting boom forces that are greater than a predetermined maximum allowable limit, the loading process will be stopped, indicating that a misalignment or other fault may have occurred.

Instructions that are input to PLC 250 are called DCL software programs 272, 274. Digital Control Logic software 272, 274 is a list of instructions (commands) that completely describes, in sequence, every numerically controlled operation to be carried out by vehicle 110. In order to describe the movement of any vehicle part, it is necessary to first establish a coordinate system(s) as a reference frame for identifying the type and direction of the motion. When a DCL software program 272, 274 is run, each instruction is interpreted by the CPU 258, which causes an action such as starting or stopping of an actuator, changing drive motor speed or rotation, or moving a cross slide in a specified direction, distance, and speed. The form that program instructions take, and how programs are stored and/or loaded into the machine, generally depends on the individual machine/control system, but the program instructions must be in a language that the machine controller can understand.

A programming language is a system of symbols, codes, and rules that describes the manner in which program instruction can be written. One of the earliest and most widely recognized numerical control programming languages is based on the ANSI/EIA RS-274-D-1980 standard (sometimes called G-code programming). This standard defines a recommended data format and codes for sending instructions to machine controllers. Digital Control Logic software 272, 274 that complies with the ANSI/EIA RS-274-D-1980 standard generally consists of a series of data blocks, each of which is treated as a unit by PLC 250 and contains enough information for a complete command to be carried out by vehicle 110. Each block is made up of one or more words that indicate to control system 130 how its corresponding action is to be performed. A word is an ordered set of characters, consisting of a letter plus some numerical digits, that triggers a specific action. The first letter of the word is called the letter address and is used to identify the word type to control system 130. For example, "X" is the letter address of a dimension word, and "F" is the letter address of a feed rate. The assigned letter addresses and their meanings are listed in ANSI/EIA RS-274-D. A benefit of the standardized RS-274-D programming format is the easy transfer of programs. However, proprietary languages are also known in the art. A proprietary format is attractive because of potential features that may not available using the standardized formats. For example, a proprietary format may make available certain codes that allow a programmer, with only a few lines of code, to program complex motions that would be difficult to program in standard RS-274-D language. The disadvantage of proprietary formats is that transferring programs to another machine may require a great deal of program modification or even complete rewriting. Generally, with programs written in a standardized format, the modifications required to get a program written for one machine to work on another machine are not extensive. Controller 130 preferably supports and can accept data in a format that conforms, at least in part, with the recommended codes described in the RS-274-D standard. Alternatively or additionally, controller 130 may also accept instructions written in a proprietary format.

Regardless of what language or programming format is used, control system 130 preferably can accept programming instructions by manual data input or computer assisted input. The choice depends very much on the complexity of the numerical control routine and, to a lesser degree, on the skill of the person who prepares the program. Manual data input permits the operator to insert machining instructions directly into PLC 250 via push buttons, pressure pads, knobs, or other arrangements. Non-volatile software routines 272 make manual data input the most practical means of software input for many operations. Computer-assisted programming uses a computer to help in the preparation of digital control logic software 272, 274 for operating vehicle 110. Computers allow defining a curve or complicated motion by generating a series of complex calculations to describe the motions in intimate detail. Thus, the process of defining many complex motions can be reduced to the simple task of calling up a computer assisted programming cycle to calculate the instructions. Additionally, graphical programming allows generating a two- or three-dimensional representation of a motion or trajectory by graphically defining the motion using a computer aided design (CAD) software program. Depending on features of the CAD software package, the same computer drawing used in the design and drafting stage of a trajectory can also be used to generate the digital control logic software program 272, 274 for the vehicle 110 to perform the motion.

The Abstract of the Disclosure is written solely for providing the United States Patent and Trademark Office and the public at large with a means by which to determine quickly from a cursory inspection the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A ground-support apparatus (110) comprising:
an omni-directional vehicle capable of rotation about a vertical axis (116) that passes through said omni-directional vehicle, said omni-directional vehicle including a frame (114) and first and second drive wheels (112) coupled to said frame (114), each of said drive wheels (112) capable of independent forward and rearward rotation about a horizontal axis (118) that intersects said vertical axis (116), and a power source (122) coupled to said first and second drive wheels (112);
a material handling mechanism (160) having a material handling mechanism axis (117) and coupled to said omni-directional vehicle so that said material handling mechanism axis (117) lies in a first radial direction from said vertical axis (116); and
a counterweight (174) having a counterweight axis (119) and coupled to said omni-directional vehicle so that said counterweight axis (119) lies in a second radial direction opposite said first radial direction from said vertical axis (116), said counterweight (174) being movable with respect to said vertical axis (116) along said second radial direction so that said counterweight (174) can compensate for varying load forces on said material handling mechanism (160).

2. The apparatus (110) of claim 1 wherein:
said material handling mechanism is coupled to said omni-directional vehicle so as to revolve about said vertical axis;
said counterweight is coupled to said omni-directional vehicle so as to revolve about said vertical axis; and
a motor (28) is coupled to said omni-directional vehicle so as to cause revolution about said vertical axis of said material handling mechanism with respect to said omni-directional vehicle.

3. The apparatus (110) of claim 1 wherein:
said material handling mechanism (160) is pivotable about a horizontal axis with respect to said omni-directional vehicle; and
an actuator (169) is coupled to said material handling mechanism for pivoting said material handling mechanism about said horizontal axis.

4. The apparatus (110) of claim 1 wherein:
at least a portion (165) of said material handling mechanism (160) is translatably movable with respect to said omni-directional vehicle; and
an actuator (123) is coupled to said material handling mechanism (160) for causing translational movement of said portion (165) of said material handling mechanism with respect to said omni-directional vehicle.

5. The apparatus (110) of claim 1 wherein:
said material handling mechanism (160) includes a primary boom member (161) that is coupled to said omni-directional vehicle and a secondary boom member (163) that is coupled to said primary boom member (161);
said secondary boom member (163) is pivotable about a horizontal axis with respect to said primary boom member (161); and
an actuator (129) is coupled to said secondary boom member (163) for pivoting said secondary boom member (163) with respect to said primary boom member (161).

6. The apparatus (110) of claim 1 further comprising:
an actuator (230) coupled to said counterweight (174) for causing translational movement of said counterweight (174) with respect to said vertical axis (116).

7. The apparatus (110) of claim 1 wherein:
said material handling mechanism (160) is articulated, defining an upper arm (170) and a lower arm (166); and
said material handling mechanism (160) further includes a hinge (168) connected between said upper arm (170) and said lower arm (166) and an actuator (167) connected to said upper arm (170) for pivoting said upper arm (170) about said hinge (168);
whereby said material handling mechanism (160) has a folded, stowed position and an unfolded, operable position.

8. The apparatus (110) of claim 1 further comprising:
an operator seat (150) coupled to said omni-directional vehicle,
a first motor (126) coupled between said power source (122) and said first drive wheel (112) for causing rotation of said first drive wheel (112),
a second motor (126) coupled between said power source (122) said second drive wheel (112) for causing rotation of said second drive wheel (112),
a first control lever (131) positioned on a first side of said operator seat (150), said first control lever (131) coupled to said first motor (126) for controlling the speed and direction of rotation of said first drive wheel (112), and
a second control lever (131) positioned on a second side of said operator seat (150), said second control lever (131)

coupled to said second motor (126) for controlling the speed and direction of rotation of said second drive wheel (112).

9. The apparatus (110) of claim 1 further comprising:
a turret (136) coupled to said omni-directional vehicle for rotation about said vertical axis (116), said handling mechanism (160) mounted to said turret (136); and
a motor (128) coupled to said omni-directional vehicle and arranged and designed to cause rotation of said turret (136) with respect to said omni-directional vehicle.

10. The apparatus (110) of claim 1 wherein:
said material handling mechanism (160) includes a cradle (172) arranged and dimensioned for carrying ordinance.

11. The apparatus (10) of claim 1 further comprising:
a circular rail (38) disposed about an outer perimeter of said omni-directional vehicle; and
a trolley hitch assembly (42) mounted on said rail (38) so that said trolley hitch assembly (42) can travel along said rail (38);
wherein said trolley hitch assembly (42) is designed and arranged for coupling to a towbar (48).

12. The apparatus (110) of claim 1 wherein:
said material handling mechanism (160) and said first and second drive wheels (112) are positioned by a plurality of numerically controlled electric devices (126, 128).

13. The apparatus (110) of claim 8 further comprising:
an electric generator (124) coupled to and powered by said power source (122);
wherein said first and second motors (126) are electric motors and said electric generator (124) provides electric power to said first and second motors (126).

14. The apparatus (110) of claim 1 further comprising:
an outrigger (240) having an axis and coupled to said omni-directional vehicle so that said outrigger axis lies in a radial direction from said vertical axis (116), said outrigger (240) being movable along said outrigger axis with respect to said vertical axis (116);
whereby said outrigger (240) supports said omni-directional vehicle under varying load forces imposed on said material handling mechanism (160).

15. The apparatus (110) of claim 14 wherein:
said material handling mechanism (160) is coupled to said omni-directional vehicle so as to revolve about said vertical axis (116); and
said outrigger (240) is coupled to said omni-directional vehicle so as to revolve about said vertical axis (116).

16. The apparatus (110) of claim 14 further comprising:
a swivel caster (242) coupled to a distal end of said outrigger (240).

17. The apparatus (110) of claim 14 further comprising:
an actuator (243, 244) coupled to said outrigger (240) for causing translational movement of said outrigger (240) along said outrigger axis with respect to said vertical axis (116).

18. The apparatus (110) of claim 1 further comprising:
a programmable logic controller (250) designed and arranged for numeric control coupled to said frame (114), said programmable logic controller (250) including a processor (258) designed and arranged to execute software instructions, memory (262, 264) coupled to said processor (258), and software instructions (272) stored in said memory (258);
wherein said first and second motors (126) are coupled to said frame (114), each of said first and second motors (126) being capable of independent numeric controlled powered forward and rearward rotation and controlled by said programmable logic controller (250); and
wherein said material handling mechanism (160) includes a numeric controlled actuator (128) designed and arranged to provide movement of said material handling mechanism coupled to and controlled by said programmable logic controller.

19. A ground-support apparatus (110) comprising:
an omni-directional vehicle capable of rotation in place about a vertical axis (116) that passes through said omni-directional vehicle;
a material handling mechanism (160) having an material handling mechanism axis (117) and coupled to said omni-directional vehicle so that said material handling mechanism axis (117) lies in a first radial direction from said vertical axis (116); and
a counterweight (174) having a counterweight axis (119) and coupled to said omni-directional vehicle so that said counterweight axis (119) lies in a second radial direction opposite said first radial direction from said vertical axis (116), said counterweight (174) being movable with respect to said vertical axis (116) along said second radial direction so that said counterweight (174) can compensate for varying load forces on said material handling mechanism (160).

20. The apparatus (110) of claim 19 wherein:
said material handling mechanism (160) and said counterweight (174) are coupled to said omni-directional vehicle so as to revolve about said vertical axis; and
said material handling mechanism is pivotable upwards and downwards with respect to said omni-directional vehicle.

* * * * *